(12) United States Patent
Hoshino et al.

(10) Patent No.: US 11,378,522 B2
(45) Date of Patent: Jul. 5, 2022

(54) INFORMATION PROCESSING APPARATUS RELATED TO MACHINE LEARNING FOR DETECTING TARGET FROM IMAGE, METHOD FOR CONTROLLING THE SAME, AND STORAGE MEDIUM

(71) Applicant: CANON KABUSHIKI KAISHA, Tokyo (JP)

(72) Inventors: Shoichi Hoshino, Tama (JP); Masakazu Matsugu, Yokohama (JP); Katsuhiko Mori, Kawasaki (JP); Yusuke Mitarai, Tokyo (JP); Atsushi Nogami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 16/820,525

(22) Filed: Mar. 16, 2020

(65) Prior Publication Data
US 2020/0300778 A1    Sep. 24, 2020

(30) Foreign Application Priority Data

Mar. 22, 2019    (JP)    .............................. JP2019-055558

(51) Int. Cl.
*G06K 9/00*        (2022.01)
*G01N 21/88*       (2006.01)
*G06T 7/00*        (2017.01)

(52) U.S. Cl.
CPC ......... *G01N 21/8851* (2013.01); *G06T 7/001* (2013.01); *G01N 2021/888* (2013.01); *G01N 2021/8858* (2013.01); *G01N 2021/8861* (2013.01); *G06T 2207/20081* (2013.01); *G06T 2207/30132* (2013.01)

(58) Field of Classification Search
CPC ....... G01N 21/8851; G01N 2021/8858; G01N 2021/8861; G01N 2021/888; G01N 2021/8883; G01N 21/9515; G06T 7/001; G06T 2207/20081; G06T 2207/30132; G06T 7/0004; G06K 9/6253;
(Continued)

(56) References Cited

U.S. PATENT DOCUMENTS

2005/0152592 A1* 7/2005 Kasai .................... G06T 7/0012
                                                        382/132
2013/0279796 A1* 10/2013 Kaizerman .......... G06K 9/6256
                                                        382/149
(Continued)

FOREIGN PATENT DOCUMENTS

JP    5384429 B2    1/2014

*Primary Examiner* — Samir A Ahmed
(74) *Attorney, Agent, or Firm* — Canon U.S.A., Inc. IP Division

(57) ABSTRACT

An information processing apparatus includes a reception unit configured to receive an input specifying a position of a detection target included in an image, an acquisition unit configured to acquire a storage amount of training data including a pair of information indicating the image and information indicating the position specified by the input, a training unit configured to train a training model to detect the detection target from the image based on the stored training data, and a display control unit configured to control a display unit to display the storage amount, and a reference amount of the training data set as an amount of the training data necessary for the training unit to train the training model, in a comparable way.

20 Claims, 16 Drawing Sheets

(58) Field of Classification Search
CPC .. G06K 9/6262; G06K 9/6267; G06K 9/6256; G06V 10/235
See application file for complete search history.

(56) References Cited

U.S. PATENT DOCUMENTS

| | | | |
|---|---|---|---|
| 2017/0011523 A1* | 1/2017 | Magai | G06K 9/6262 |
| 2018/0122076 A1* | 5/2018 | Abedini | G06T 3/0068 |
| 2018/0204132 A1* | 7/2018 | Liang | G06T 7/0004 |
| 2018/0349633 A1* | 12/2018 | Takimoto | G06K 9/6215 |
| 2020/0334801 A1* | 10/2020 | Takahashi | A61B 5/00 |
| 2021/0019878 A1* | 1/2021 | Iizawa | G06T 7/0008 |
| 2021/0282640 A1* | 9/2021 | Song | A61B 3/0025 |

* cited by examiner

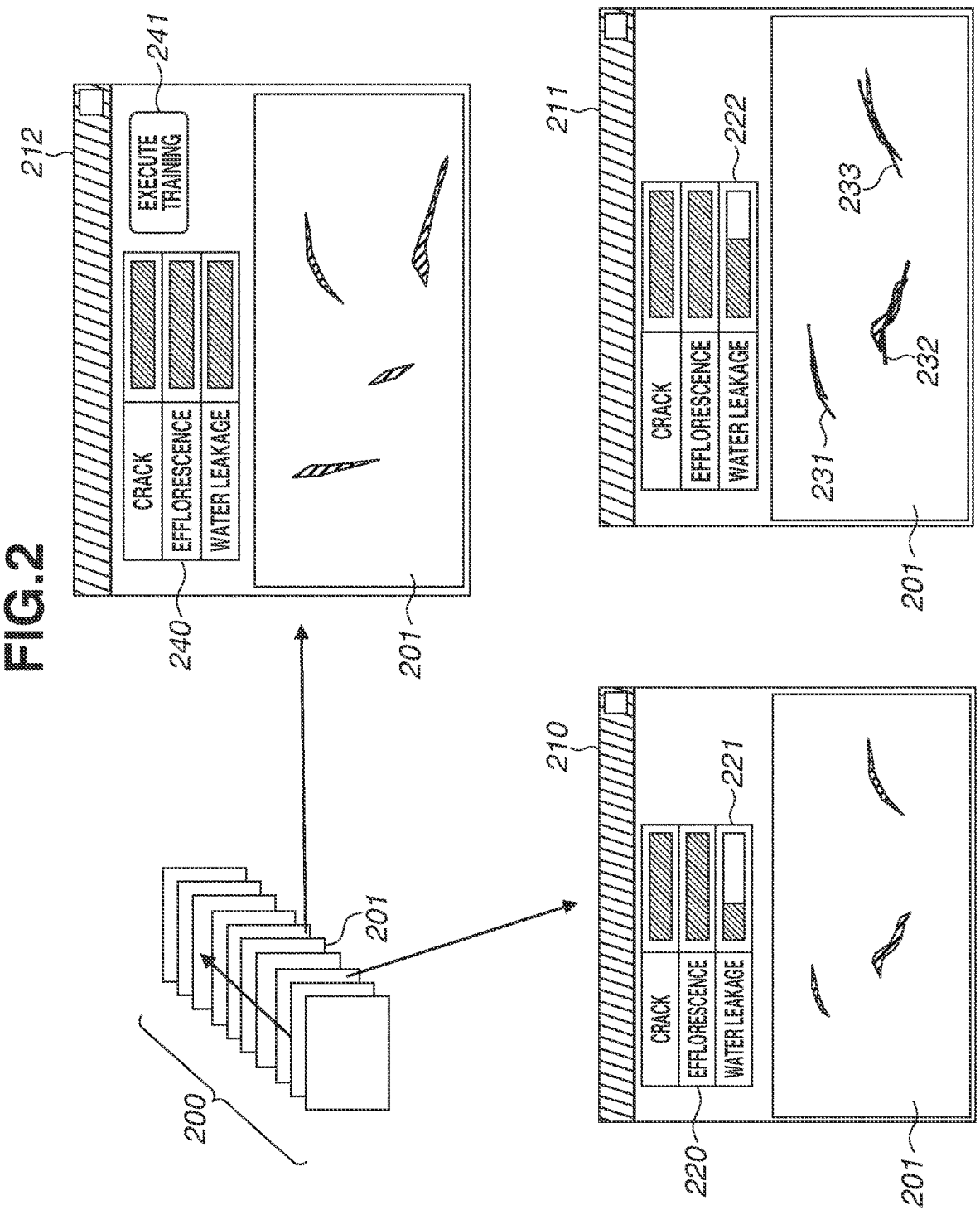

FIG.4

| CLASSIFICATION ID | WALL SURFACE COLOR | TEXTURE | DEFECT PATTERN |
|---|---|---|---|
| 01 | WHITE | SMOOTH | CRACK |
| 02 | BLACK | UNEVEN | CRACK |
| 03 | GRAY | SMOOTH | EFFLORESCENCE |
| 04 | WHITE | UNEVEN | WATER LEAKAGE |
| 05 | GRAY | UNEVEN | EFFLORESCENCE |
| 06 | GRAY | UNEVEN | WATER LEAKAGE |
| ⋮ | ⋮ | ⋮ | ⋮ |

| WALL SURFACE COLOR | TEXTURE | DEFECT PATTERN | DATA AMOUNT |
|---|---|---|---|
| WHITE | SMOOTH | CRACK | 20 m² |
| GRAY | UNEVEN | CRACK | 15 m² |
| WHITE | UNEVEN | EFFLORESCENCE | 1 m² |
| ⋮ | ⋮ | ⋮ | ⋮ |

FIG.11A
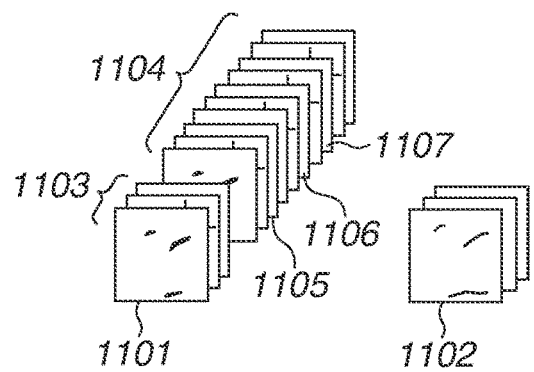
FIG.11B
| CONCRETE WALL SURFACE COLOR | TEXTURE | DEFECT PATTERN | STORAGE STATUS | |
|---|---|---|---|---|
| WHITE | SMOOTH | CRACK | ▨▨▨▨▨▨ | 100% |
| BLACK | SMOOTH | WATER LEAKAGE | ▨▨▨▨▨▨ | 100% |
| WHITE | UNEVEN | EFFLORESCENCE | ▨▨▨▨▨▨ | 100% |
| GRAY | UNEVEN | CRACK | ▨▨▨▨▨▨ | 100% |
| GRAY | SMOOTH | CRACK | ▨▨▨▨▨ | 90% |
FIG.11C
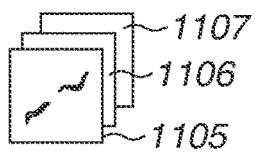
FIG.11D
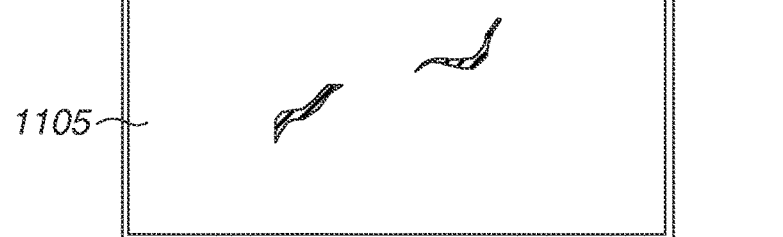

INFORMATION PROCESSING APPARATUS RELATED TO MACHINE LEARNING FOR DETECTING TARGET FROM IMAGE, METHOD FOR CONTROLLING THE SAME, AND STORAGE MEDIUM

BACKGROUND

Field of the Disclosure

The present disclosure relates to a technique for detecting a target from an image by using machine learning.

Description of the Related Art

When inspecting a wall surface of a structure such as a bridge, and inspecting an outer appearance of a part and a product exterior, an inspector checks a defect, such as a crack, through visual observation. Such an inspection operation requires a high operation cost. Accordingly, Japanese Patent No. 5384429 discusses an inspection method for automatically detecting a defect from a captured image of an inspection target by using a pattern recognition technique.

In the pattern recognition technique as discussed in Japanese Patent No. 5384429, to train a classifier to achieve a target detection accuracy, a sufficient amount of diverse types of training data corresponding to characteristics of detection target defects is required. In a method for generating the training data, a user manually inputs defect data visually checked by the user for part of the captured image of the inspection target to use the data as the training data. When a sufficient amount of the training data has been stored, the classifier is trained by using the training data, and processing for detecting a defect is performed by using the trained classifier on a remaining image. This improves efficiency of an operation for detecting the defect occurring in an inspection target structure. However, since processing for generating the training data takes time and efforts, there has been a demand for efficiently storing a required amount of the training data.

SUMMARY

According to an aspect of some embodiments, an information processing apparatus includes a reception unit configured to receive an input specifying a position of a detection target included in an image, an acquisition unit configured to acquire a storage amount of training data including a pair of information indicating the image and information indicating the position specified by the input, a training unit configured to train a training model to detect the detection target from the image based on the stored training data, and a display control unit configured to control a display unit to display the storage amount, and a reference amount of the training data set as an amount of the training data necessary for the training unit to train the training model, in a comparable way.

Further features of various embodiments will become apparent from the following description of exemplary embodiments with reference to the attached drawings.

BRIEF DESCRIPTION OF THE DRAWINGS

FIG. 2 is a diagram schematically illustrating a screen transition when defect data is input to an inspection target image.

FIG. 4 is a table illustrating an example of a data classification table.

FIGS. 11A, 11B, 11C, and 11D are diagrams illustrating examples of an inspection target image group and corresponding defect data.

DESCRIPTION OF THE EMBODIMENTS

Figure 1A:
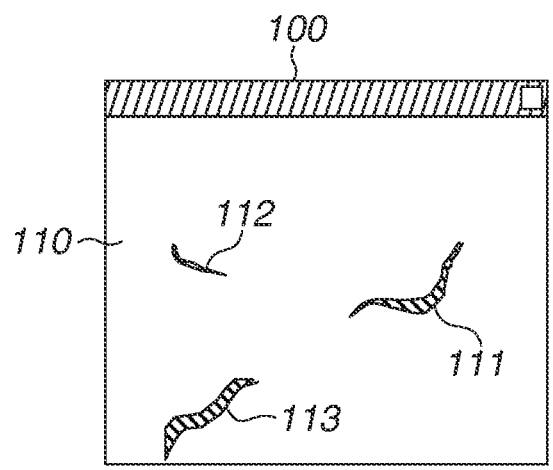
FIGS. 1A, 1B, and 1C are diagrams illustrating an example of defect data to be stored as training data and the defect data superimposed on the captured image.

Exemplary embodiments will be described in detail below with reference to the accompanying drawings. Configurations described in the exemplary embodiments below are representative examples, and the scopes of some embodiments are not limited to the specific configurations.

A first exemplary embodiment will be described below using an example of processing for displaying a storage status of training data to the user, who visually checks an inspection target image to identify a defect, and depending on the storage status, prompting the user to issue an instruction for executing training by using the stored training data. In particular, the present exemplary embodiment will be described below using an example of an information processing system for performing so-called inspection for infrastructure for checking an aged deterioration of a structure such as a bridge.

Terms used in the descriptions of the present exemplary embodiment are defined below. In the descriptions of the information processing system for performing the inspection for infrastructure, the term inspection target refers to a concrete structure. The user of the information processing system according to the present exemplary embodiment intends to inspect a defect region to determine whether a defect, such as a crack, exists on a surface based on the captured image of the inspection target. In the case of the concrete structure, for example, the term defect region refers to a crack, delamination, and peeling of concrete. The term also refers to a region with a defect, such as efflorescence, reinforcing iron rod exposure, rust, water leakage, water dripping, corrosion, damage, a cold joint, a deposit, and a rock pocket.

The term defect data refers to combination data of a defect type and positional information about a position where a defect region exists. For example, the user visually checks the captured image of the inspection target and identifies the defect. The defect data includes positional information representing the identified defect with lines and information about the defect type. The defect data may further include detailed information such as a width of a crack. The defect data may include a defect type and positional information obtained as a result of defect detection processing by an information processing apparatus. However, in a case where the defect type is identified to be one type or a case where the defect type does not need to be distinguished, positional data is handled as the defect data. The term training data refers to a pair of a captured image of the inspection target as a subject and the defect data. In the present exemplary embodiment, in particular, the captured image of the inspection target serves as input data, and a classifier of a defect detection method is trained by using the training data in which the defect data serves as correct answer data (supervisory data). In the present exemplary embodiment, user-input defect data is used as the defect data to be used as the training data. However, a result of the defect detection method, after being corrected by the user, can also be used as the defect data.

The term data classification refers to classification information for classifying characteristics and properties of the training data. In the present exemplary embodiment, the storage status of the training data is displayed for each data classification, allowing the user to determine whether desirable training data has been stored. In the present exemplary embodiment, the data classification in the information processing system related to the inspection for infrastructure is, for example, by a type of the concrete wall surface including a defect region. More specifically, data is classified into each type by color and surface roughness of the concrete wall surface.

Figure 1B:
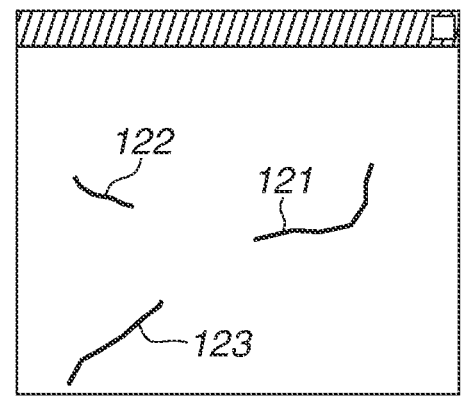
Figure 1C:
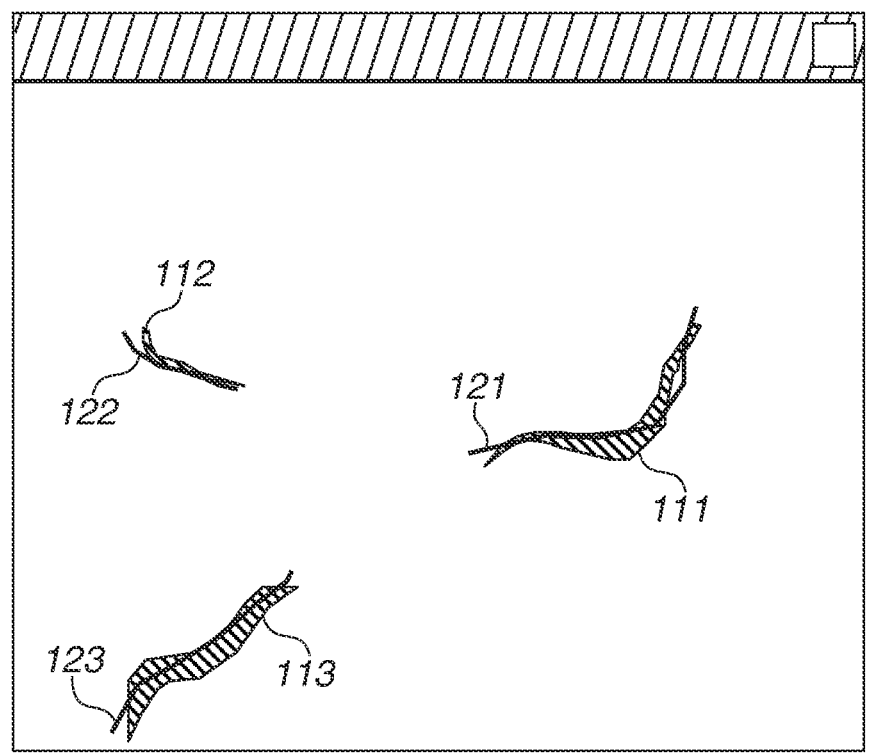

Firstly, an example of a screen displayed by the information processing apparatus according to the present exemplary embodiment will be described below with reference to FIGS. 1A, 1B, 1C, and 2. FIGS. 1A, 1B, and 1C are diagram illustrating a captured image of a concrete wall surface, defect data indicating a result of input of defect regions in an application window 100, and the defect data superimposed on the captured image. FIG. 1A illustrates a state where only a captured image 110 of the concrete wall surface as an inspection target is displayed. Hereinafter, the captured image of the concrete wall surface is referred to as an inspection target image or simply as an image. The image 110 includes cracks (defect regions) 111, 112, and 113. A data input operator or inspection manager (hereinafter referred to as a user) visually checks the cracks 111 to 113 existing in the image 110 and performs a defect data input operation. The defect data input operation refers to an operation for inputting linear data on an image, for example, by tracing a defect by using a mouse or a pen tablet. This allows the user to input the data indicating positions of the cracks 111 to 113 as detection targets according to the present exemplary embodiment based on a coordinate system associated with the image. FIG. 1B illustrates a state where defect data 121, 122, and 123 are input by the user based on the image 110 illustrated in FIG. 1A. Although the actual cracks may be regions each having an area as illustrated in FIG. 1A, the respective defect data 121 to 123 illustrated in FIG. 1B and subsequent drawings are indicated with thin solid lines to simplify descriptions. However, the information processing apparatus may handle each piece of the defect data as a region and receive an input operation in which a position and an area of the defect data is defined. FIG. 1C is a diagram illustrating the defect data 121, 122, and 123 illustrated in FIG. 1B superimposed on the image 110 illustrated in FIG. 1A.

In a case where there are a large number of inspection target images and a case where an inspection target image has a large size, defect data input operations particularly take time and effort. In such cases, to improve efficiency of the operations, it is effective to acquire defect data by performing not only a manual tracing operation but also the defect detection method for detecting a defect by using the classifier for identifying the defect included in the image. In such a case, the user can check if a defect detection result is correct by comparing the inspection target image with the defect data, and then correct the defect detection result only when necessary. This reduces an operation load compared to a case of inputting the defect data from scratch. The present exemplary embodiment will be described below on a premise that the classifier is trained to support processing for identifying the defect type. However, in an aspect of a function of detecting the defect (crack) from the image, the classifier is equivalent to a training model (trained model) called a detector.

To train the classifier, it is necessary to prepare a sufficient amount of diverse types of the training data. The user inputs the defect data, and a pair of the image and the defect data is acquired, as illustrated in FIG. 1C. The pair can be utilized as the training data. More specifically, at the same time as when the user inputs the defect data, the pair of the image and the defect data is stored as the training data. When the amount of the training data of a predetermined type reaches the sufficient amount, the training of the classifier is executed using the stored training data. Then, by using a trained classifier, the defect detection method is applied to remaining inspection target images to acquire a detection result. Thus, the load of the defect data input operations is reduced.

In the present exemplary embodiment, the storage status of the training data for each type is displayed on a predetermined display unit while the user is inputting the defect data. This allows the user to grasp the storage status of the training data for each type, making it possible to efficiently perform the defect data input operations for acquiring the necessary amount of the training data.

A method for displaying the storage status of the training data will be described below with reference to FIG. 2. FIG. 2 is a diagram schematically illustrating a screen transition when the user inputs the defect data onto the inspection target image. FIG. 2 illustrates a state where images in an inspection target image group 200 are sequentially displayed one by one, and the user inputs the defect data while checking a presence or absence of a defect in each image. A window 210 displays a selected image 201 and displays a progress bar for each type in a progress bar display area 220 indicating the storage status of the training data. In FIG. 2, a bar of a progress bar 221 has not reached an upper limit, indicating a state where the amount of the training data is not sufficient to execute the training. The user performs the defect data input operation while visually checking the image 201. A window 211 indicates a display state when the defect data is input. At this time, a pair of the image 201 and the defect data (defects 231, 232, and 233) on the window 211 is stored as the training data, and a bar of a progress bar 222 increases. In this way, at the same time as when the user inputs the defect data, the training data is stored for each type.

A window 212 displays a state where defect data input operations have been performed on a predetermined number of images and where the sufficient amount of the training data for each type has been stored. In a progress bar display area 240 on the window 212, bars of all of the progress bars have reached the upper limits. At this time, a screen is displayed to prompt the user to issue an instruction for executing the training. For example, an Execute Training button 241 is displayed in the window 212. A method for displaying the storage status of the training data and a method for determining whether to prompt the user to execute the training will be described in detail below.

In the descriptions below, an image handled in the present exemplary embodiment is a visible light image (red, green, and blue (RGB) image) capturing a concrete wall surface as the inspection target, but some embodiments are not limited thereto. For example, some embodiments are also applicable to a thermal image captured by an infrared camera and an image captured by a line sensor camera.

Figure 3A:
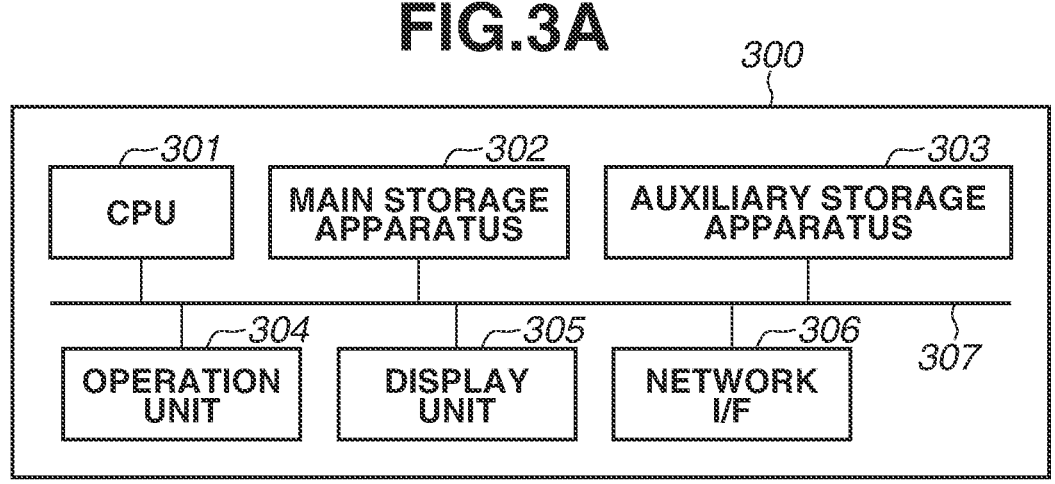
FIGS. 3A and 3B are block diagrams illustrating examples of configurations of an information processing apparatus.
Figure 3B:
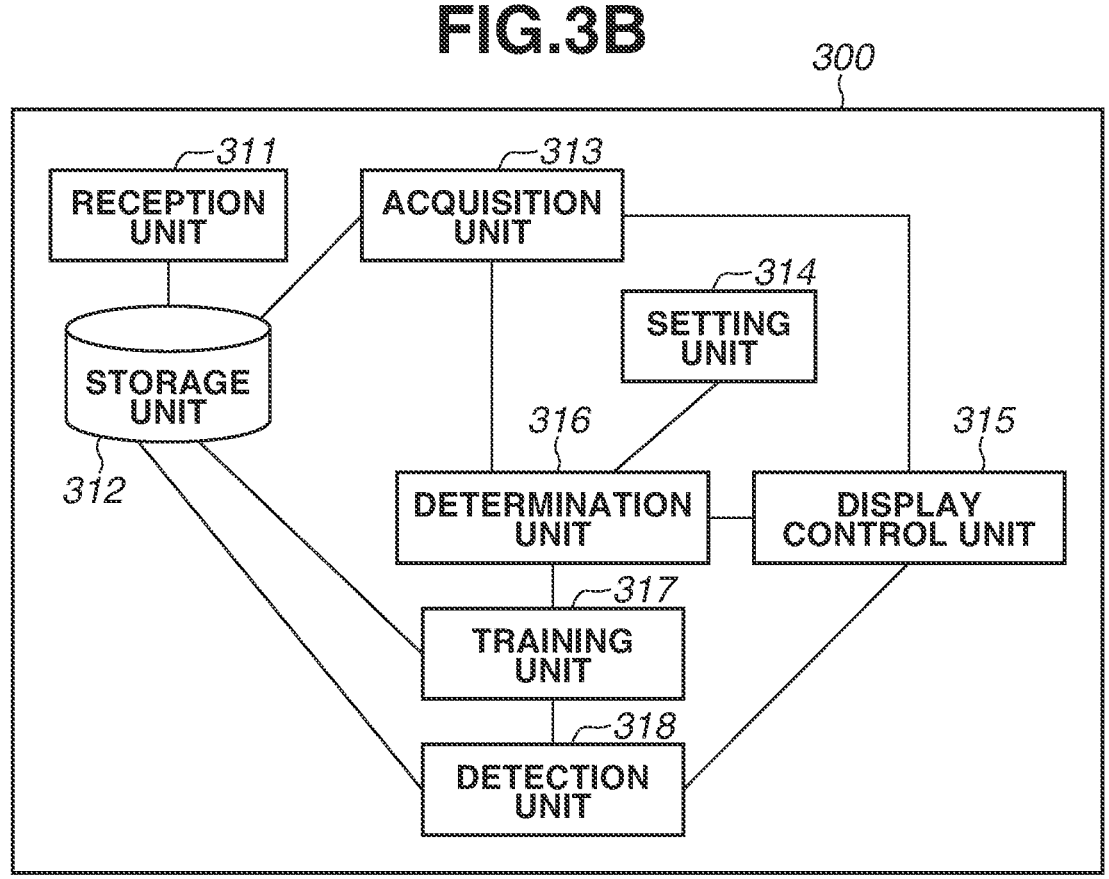

FIGS. 3A and 3B illustrate examples of configurations of an information processing apparatus 300 according to the present exemplary embodiment. FIG. 3A is a block diagram illustrating an example of a hardware configuration of the information processing apparatus 300 according to the present exemplary embodiment. The information processing apparatus 300 can be implemented by a calculating machine including a central processing unit (CPU) 301, a main storage device 302, an auxiliary storage device 303, an operation unit 304, a display unit 305, a network interface (I/F) 306, and a system bus 307. The components are connected via the system bus 307 in a mutually communicable manner. The calculating machine can be a general-purpose personal computer (PC) or another information processing apparatus, such as a server apparatus, a tablet apparatus, or a built-in type computer. A hardware component optimally designed for the processing according to one or more embodiments is also applicable.

The CPU 301 is a processor for controlling the information processing apparatus 300. The main storage device 302 is a storage device, such as a random access memory (RAM), that functions as a work area for the CPU 301 and a temporary data storage area. The auxiliary storage device 303 is a storage device for storing various programs, various setting information, various display conditions, and view data. The auxiliary storage device 303 is, for example, a read only memory (ROM), hard disk drive (HDD), or solid state drive (SSD). Each of the main storage device 302 and the auxiliary storage device 303 is an example of a storage unit.

The operation unit 304, such as a mouse, a keyboard, a touch pad, a touch panel, and a pen tablet, is an input apparatus used for inputting information to the information processing apparatus 300. The display unit 305 is a display apparatus such as a monitor, a display, and a touch panel display. The network I/F 306 is an interface used for communication with an external apparatus via a network. According to the present exemplary embodiment, the operation unit 304 and the display unit 305 are different components. However, as another example, the operation unit 304 and the display unit 305 may be a single component having both functions of the input apparatus, such as a touch panel and tablet, and of the display apparatus. These units may be external apparatuses connected to the information processing apparatus 300 via an input/output interface.

FIG. 3B is an example of a block diagram illustrating a software configuration of the information processing apparatus 300. The information processing apparatus 300 includes a reception unit 311, an acquisition unit 313, a setting unit 314, a display control unit 315, a training unit 317, and a detection unit 318. Each of the function units is implemented by the CPU 301 loading a program stored in the auxiliary storage device 303 into the main storage device 302 and then executing processing corresponding to each of the flowcharts described below. Then, the CPU 301 stores a result of the execution of the processing in the main storage device 302. For example, in a case where a hardware component is configured as a substitute for software processing by using the CPU 301, it is necessary to configure a calculation unit or a circuit corresponding to the processing of each of the function units described below.

The reception unit 311 receives operation information input via the operation unit 304 by the user. In the present exemplary embodiment, the reception unit 311 receives an input for specifying a position of the detection target included in a captured image of the inspection target (inspection target image). In the present exemplary embodiment, the detection target is a crack. The reception unit 311 receives a user operation on a graphical user interface (GUI) item displayed on the display unit 305 and notifies each related function unit of the user operation. The acquisition unit 313 acquires the storage amount of the training data stored in a storage unit 312. The setting unit 314 sets a reference amount of the training data necessary for the training based on a user input or a past training result. In the present exemplary embodiment, the reference amount refers to the amount of the training data that needs to be trained to perform the detection processing with demanded accuracy. The reference amount is preset as one value indicating a lower limit. For example, in a certain setting method, X is defined as the reference amount in a case where input of the defect data is required for at least X detection target images in a predetermined size. The display control unit 315 is a function unit for controlling contents to be displayed on the display unit 305. In the present exemplary embodiment, the defect data representing the detection target is superimposed on the inspection target image, and the reference amount and the storage amount of the training data are displayed in a comparable way.

A determination unit 316 determines whether the storage amount of the training data has reached the set reference amount. In the present exemplary embodiment, in a case where the determination unit 316 determines that the storage amount of the training data has reached the set reference amount, the determination unit 316 notifies the display control unit 315 of the determination. Then, the display control unit 315 presents, to the user, a GUI for issuing an instruction for executing the training. A display item, such as the Execute Training button 241 illustrated in FIG. 2, is displayed to prompt the user to determine whether to execute the training.

After the storage amount of the training data has reached the set reference amount, the training unit 317 trains a training model for detecting the detection target from the inspection target image based on the stored training data. In the present exemplary embodiment, training is performed in response to reception of a user operation specifying the Execute Training button 241, which is a GUI displayed as a result of the determination by the determination unit 316. The detection unit 318 detects the detection target from the inspection target image by using the classifier (trained model) that has been trained by the training unit 317. However, the detection unit 318 may be omitted in a case where the information processing apparatus 300 is a learning apparatus in the information processing system that includes the learning apparatus for executing the training and a detection apparatus for executing the detection as different apparatuses.

The storage unit 312 is a function unit of the auxiliary storage device 303 or an external storage device connected via the network I/F 306. The storage unit 312 stores the inspection target image, the defect data corresponding to the inspection target image, and information about characteristics, such as texture and information based on a defect type of the inspection target image, as a data classification table. Among such pieces of data, the pair of the inspection target image and the defect data is referred to as the training data according to the present exemplary embodiment. In other words, the training data is stored in the storage unit 312. The inspection target image may be replaced with a feature quantity obtained as a result of performing feature extraction. A data amount to be stored in the storage unit 312 may be reduced by configuring to store feature quantity data instead of image data. In any case, information representing the inspection target image is stored as input data of the training data.

FIG. 4 is a table illustrating an example of the data classification table stored in the storage unit 312. The data classification according to the present exemplary embodiment refers to classification information for classifying the properties of the training data and is used to determine whether the training data having the necessary properties has been stored. FIG. 4 illustrates an example of the data classification table for the training data to be used for the inspection for infrastructure. The data classification table includes a classification identifier (ID) and other information for each item. The classification ID is a unique number automatically assigned in order of registration of the data classification. The properties of the training data are classified by the classification ID in advance. In FIG. 4, each individual classification associated with the classification ID corresponds to a combination of a background feature and the detection target. In FIG. 4, a combination of a color and a texture of the concrete wall surface (background feature) and a defect pattern (detection target type) is used as an item for defining the classification, but another item may also be used.

Figure 5:
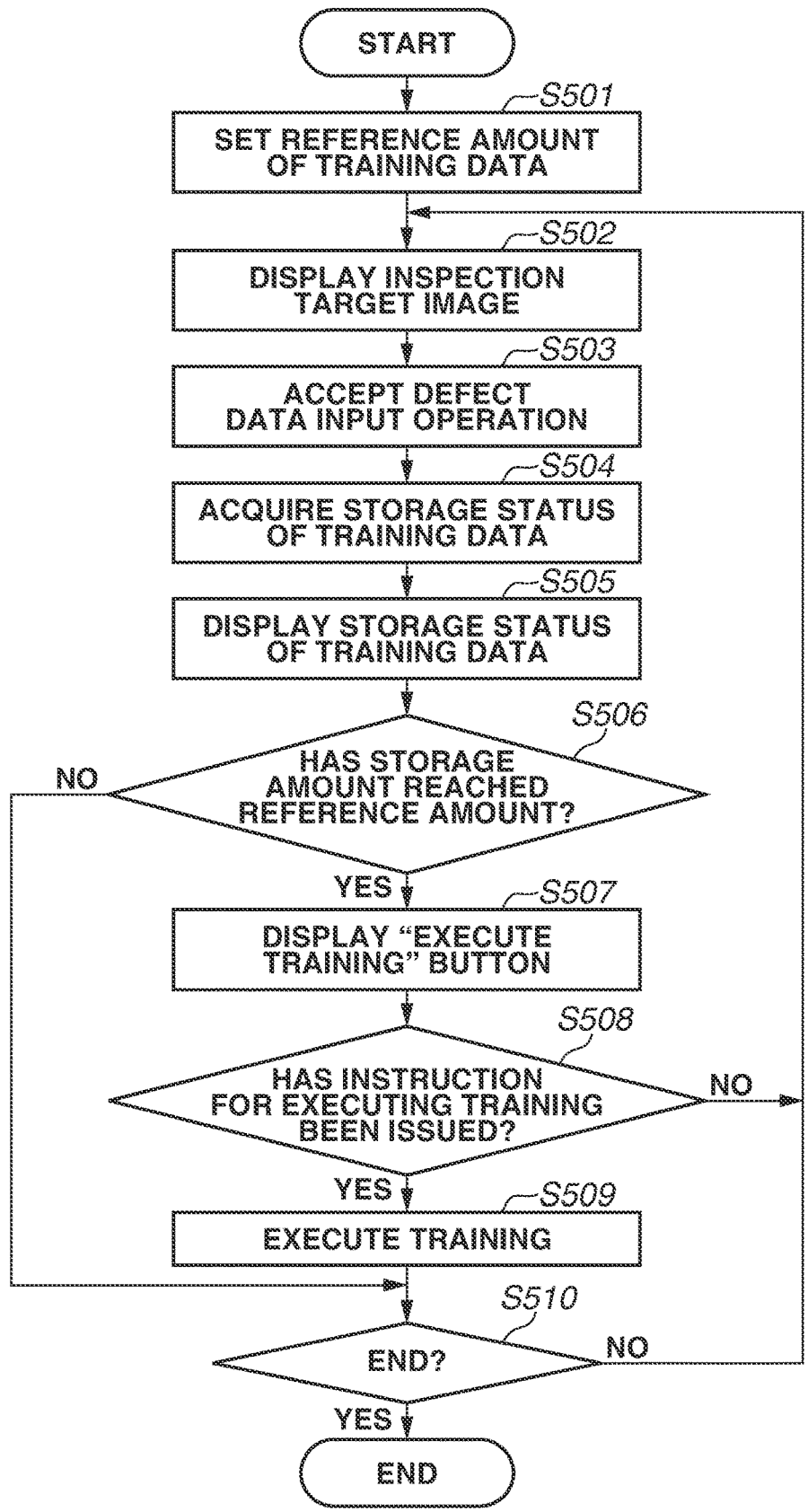
FIG. 5 is a flowchart illustrating an example of processing performed by the information processing apparatus.

Contents of specific processing performed by the information processing apparatus 300 according to the present exemplary embodiment will be described below with reference to a flowchart. FIG. 5 is a flowchart illustrating an example of main processing performed by the information processing apparatus 300 according to the present exemplary embodiment. In the descriptions below, each operation number will be indicated with a leading S. In the present exemplary embodiment, when an application for performing the processing for detecting a defect from the inspection target image is activated in the information processing apparatus 300, the work area for the CPU 301 is initialized, and the processing in S501 is started.

In S501, the setting unit 314 sets the reference amount of the training data, which is the data amount necessary for executing the training. The basic reference amount according to the present exemplary embodiment is an amount predetermined for each image and each defect type. Any applicable method can be used to set the reference amount of the training data. For example, acquiring the reference amount on an experimental basis may be a possible method. As another method, the user may directly specify the reference amount of the training data for each type.

In S502, the display control unit 315 reads at least one image of the inspection target image group 200 from the storage unit 312 and displays the image on the display unit 305. In S503, the reception unit 311 receives an operation for specifying the position of the defect data in the displayed inspection target image. In the present exemplary embodiment, forms of the screens displayed on the display unit 305 in the processing in S502 to S503 are as illustrated in the windows 210 to 212 in FIG. 2. At this time, in addition to the position of the defect data, the user may also be able to specify the defect pattern (type) by selecting the defect pattern from options. Each time the input of the defect data is received, the reception unit 311 stores, in the storage unit 312, a pair of the displayed inspection target image and the defect data as the training data. In S504, the acquisition unit 313 acquires the storage status of the training data from the storage unit 312. In the present exemplary embodiment, the acquisition unit 313 acquires the storage status of the training data composed of pairs of the user-input defect data and the corresponding image in the storage unit 312.

Figures 6A, 6B:
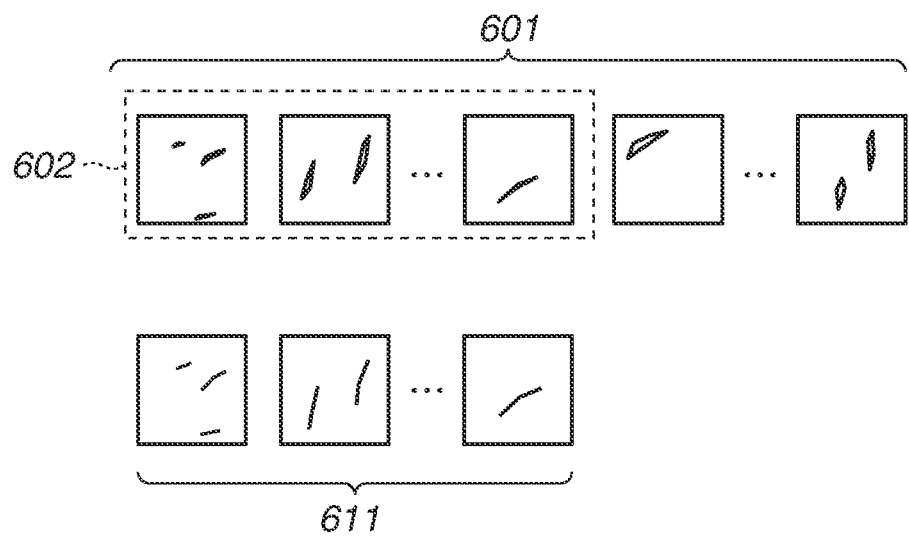
FIGS. 6A and 6B are diagrams schematically illustrating processing for storing the training data.

Processing for storing the training data according to the present exemplary embodiment will be described below with reference to FIGS. 6A and 6B. FIGS. 6A and 6B schematically illustrate processing for storing the training data according to the first exemplary embodiment. In the present exemplary embodiment, images of the inspection target image group 200 are displayed one by one, on each of which an input of the defect data is performed by the user. Then, the CPU 301 stores the pair of the input defect data and the displayed image as the training data. Thus, before the defect data input operations are completed on all of the images in the inspection target image group 200, a result of the operations performed so far is stored as the training data. When the storage amount of such data reaches the reference amount, it becomes possible to execute the training to perform classifier-based detection and identification of a crack on the remaining images of the inspection target image group 200. FIG. 6A illustrates a state where the defect data is input to an image group 602, which is part of an inspection target image group 601, and defect data 611 is obtained. In FIG. 6A, a pair of the image group 602 surrounded by dotted lines and the defect data 611 forms the training data.

The information processing apparatus 300 according to the present exemplary embodiment analyzes this training data to acquire properties of the images and the defect types. Then, based on acquired information and the data classification information registered in the data classification table, the training data is stored for each classification. In the present exemplary embodiment, the color of the concrete wall surface in the image and the texture indicating smoothness of the image are acquired as information about the properties of the image (inspection target image). In the inspection for infrastructure, the captured images of the concrete wall surface are used. Thus, the color of the concrete wall surface can be determined based on a feature quantity, such as an average luminance value. To acquire the texture of the image, for example, the texture, such as unevenness and smoothness, can be determined based on spatial frequency information obtained by fast Fourier transform (FFT). Since the defect type is information held by the defect data, the defect type can be acquired by analyzing the defect data. Based on information acquired through the analysis and the information in the data classification table stored in the storage unit 312, the training data can be stored for each data classification. After the classification, by calculating the data amount for each data classification, data types (data classifications) included in the training data and the data amount for each classification can be acquired, as illustrated in FIG. 6B. In S504, the acquisition unit 313 acquires the storage amount of the training data for each classification in this way.

Referring back to the description of the flowchart illustrated in FIG. 5, in S505, the display control unit 315 generates display data for displaying the storage status of the training data acquired by the acquisition unit 313 on the display unit 305 and outputs the display data to the display unit 305. As illustrated in FIG. 2, in the present exemplary embodiment, the progress bar display area 220 indicating the storage amount with respect to the reference amount of the training data set in S501 is displayed in an upper portion of the screen. Displaying the storage amount as the progress bar indicating a degree of progress with respect to the reference amount allows the user to easily compare the storage amount and the reference amount and check a difference between the amounts.

In S506, the determination unit 316 determines whether the acquired storage amount of the training data has reached the set reference amount. In the present exemplary embodiment, unless otherwise specified, the determination unit 316 comprehensively determines whether the storage amount of the training data has reached a predetermined amount for each of the data classifications. More specifically, the determination unit 316 determines whether the storage amount acquired in S504 has reached the reference amount of the training data set in S501. A determination method can be represented, for example, by the following inequality (1).

$$D_p \leq V_p \ (p=1,2,\ldots,P) \tag{1}$$

Parameters Dp and Vp represent the reference amount of the training data and the storage amount of the training data, respectively, in the p-th data classification. With the inequality (1), the determination unit 316 determines whether the storage amount of the training data has reached the reference amount for each of the data classifications.

When the determination unit 316 determines that the storage amount has reached the reference amount (YES in S506), the processing proceeds to S507. In S507, the display control unit 315 causes the display unit 305 to display the Execute Training button 241 to prompt the user to execute the training. In S508, the determination unit 316 determines whether the user has issued an instruction for executing the training. In the present exemplary embodiment, when the user performs an operation on the Execute Training button 241, the determination unit 316 determines that the user has issued the instruction for executing the training. If the determination unit 316 determines that the user has issued the instruction for executing the training (YES in S508), the processing proceeds to S509. In S509, the training unit 317 executes the training of the classifier (training model) based on the stored training data.

In S510, the determination unit 316 determines whether the CPU 301 has issued an instruction for ending the application for performing the defect detection processing from the inspection target images. If the determination unit 316 determines that the instruction for ending the application has not been issued (NO in S510), the processing returns to S502. In S502, the reception unit 311 receives the defect data input operation for the same inspection target image or another inspection target image. On the other hand, if the determination unit 316 determines that the instruction for ending the application has been issued (YES in S510), the processing of the flowchart illustrated in FIG. 5 ends. If the determination unit 316 determines that the storage amount has not reached the reference amount (NO in S506), the processing skips S507 to S509 and proceeds to S510. If the determination unit 316 determines that the user has not issued the instruction for executing the training (NO in S508), the processing returns to S502. In S502, the reception unit 311 receives the defect data input operation for the next inspection target image. This completes the descriptions of the example of the main processing performed by the information processing apparatus 300 according to the present exemplary embodiment.

In the processing in S506, the method for determining whether the storage amount has reached the reference amount can be changed depending on properties of the inspection target or detection target and accuracy of the detection result desired by the user. For example, determination can be performed independently for each data classification. In such a case, the determination unit 316 determines whether the storage amount of the training data has reached the reference amount for one or more data classifications among five different data classifications based on the inequality (1). By the determination unit 316 performing the determination based on the storage amounts of some of the data classifications having large data amounts, the storage amount of the training data for a defect that rarely occurs can be ignored. As another determination method, the determination unit 316 can determine whether the storage amount of the training data has reached the reference amount for one or more data classifications among data classifications set in advance. This determination method is effective in a case where a desirable training data classification is identified in advance. In this case, the determination can be implemented by the user setting the data classification to be stored in advance. As still another determination method, the determination unit 316 may determine whether the total storage amount of the training data has reached the reference amount regardless of a type of the data classification.

Figures 7A, 7B:
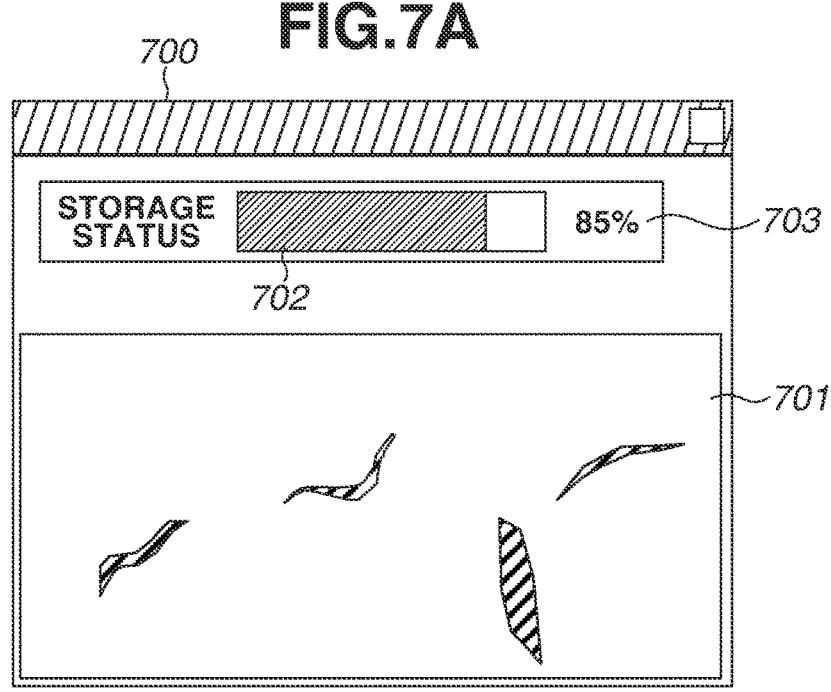
FIGS. 7A and 7B are diagrams illustrating examples of display data displayed by the information processing apparatus.

Display data to be displayed on the display unit 305 by the display control unit 315 in the main processing will be described in detail below with reference to FIGS. 7A, 7B, 8A, and 8B. FIG. 7A is a diagram illustrating a state where the storage status of the training data is displayed in the processing in S505. In an application window 700, a progress bar 702 and a progress rate 703 that indicate the overall storage status are displayed together with an inspection target image 701. As an input of the defect data is received by the reception unit 311 and new training data is stored, a bar of the progress bar 702 and the progress rate 703 increase to indicate a state where the storage amount increases. The color and thickness of the bar of the progress bar 702 and a text of the progress rate 703 may be changed with the storage status. Changing the display with the storage status in this way makes it easier to intuitively grasp the storage status.

FIG. 7B is a table illustrating an example of a detailed display of the storage status of the training data. In FIG. 7B, an application window 711 displays a storage status 712 for each data classification in list form. Displaying detailed information in this way makes it easier for the user to grasp a level of the storage amount of the training data for each data type. Displayed items include the concrete wall surface, texture, defect pattern, storage amount, and storage ratio. However, other items may also be displayed. The storage status is initially displayed in descending order of the storage ratio. However, it is desirable that the display order can be freely changed by the user. Possible methods for controlling the display order include selecting a display order from a pull-down menu 713 for determining the display order and clicking a sort control icon 714 for each item.

Such a screen for displaying the storage status of the training data may be changed as required by the user. For example, if the user clicks the progress bar 702 or the progress rate 703 in the screen illustrated in FIG. 7A, the detailed screen illustrated in FIG. 7B appears. If the user clicks a Change Display button 715 illustrated in FIG. 7B, the screen illustrated in FIG. 7A appears. Such a screen transition enables the user to view information as necessary at a necessary level each time. Depending on a calculation method of the storage amount, a difference may arise between timing when the defect data is input to one of the inspection target images and the training data is added and timing when progress of the progress bar and a numerical value of the progress rate, which indicate the storage status of the training data, are updated. Thus, the method for calculating the storage status may be adjusted so that the timing when the progress rate of the progress bar reaches 100% is associated with the processing for comparing the storage amount and the reference amount in S506. By making the timing when the bar of the progress bar reaches the upper limit (timing when the progress rate reaches 100%) coincide with the timing when the storage amount reaches the reference amount, it becomes easier for the user to grasp the timing when the training becomes executable.

Figure 8A:
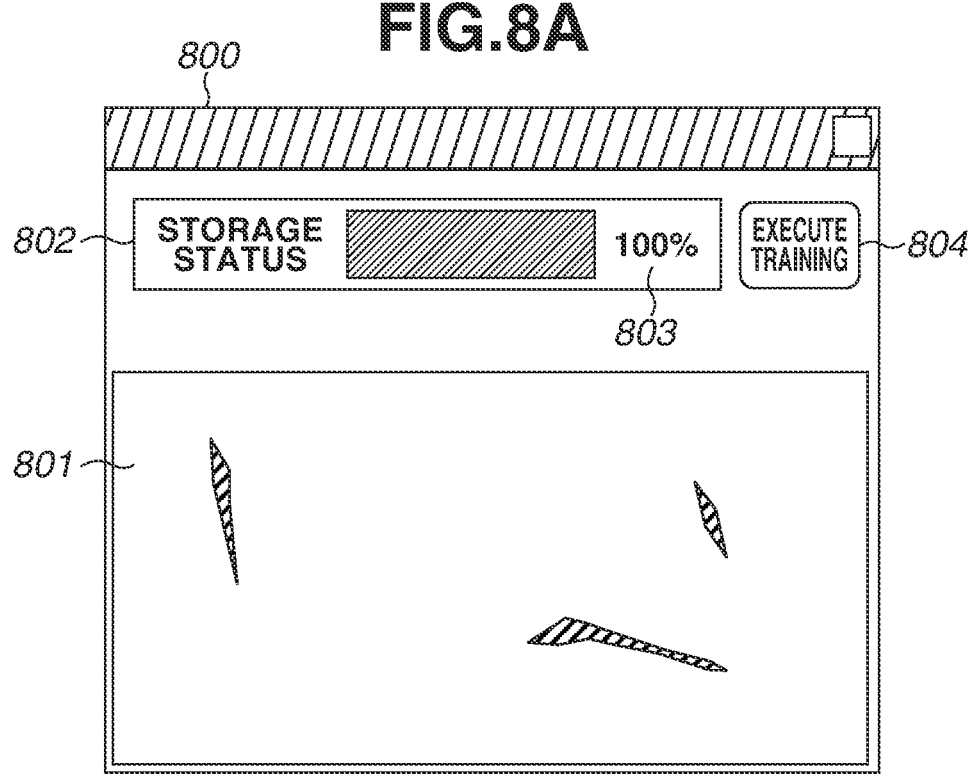
FIGS. 8A and 8B are diagrams illustrating other examples of display data displayed by the information processing apparatus.

FIG. 8A illustrates a screen displayed in the processing in S507 as a result of the storage amount reaching the reference amount. Similar to FIGS. 7A and 7B, an inspection target image 801, a progress display area 802, and a progress rate 803 are displayed in an application window 800. The application window 800 represents a screen displayed immediately after an input of the defect data has been completed on the previous inspection target image, and the next image has been displayed. Thus, no user-input defect data is superimposed on the inspection target image 801. In the progress display area 802, a progress bar has reached the upper limit, and the progress rate 803 is 100%, indicating that a sufficient amount of data necessary for the training has been stored. At this time, in the present exemplary embodiment, an Execute Training button 804 is displayed in the vicinity of the progress rate 803 to notify the user that the training has become executable and to prompt the user to execute the training. In the present exemplary embodiment, the Execute Training button 804 is displayed after the determination processing in S506. However, a different display method is also applicable. For example, the Execute Training button 804 may be constantly displayed in a disabled state and may be enabled immediately after the determination processing in S506. The disabled and enabled states can be indicated by, for example, changing a color of the button.

Figure 8B:
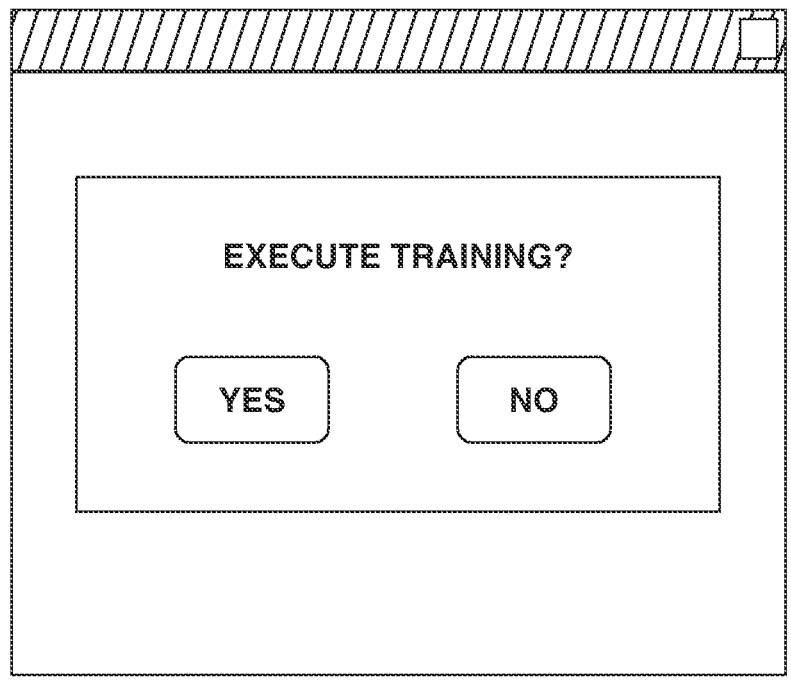

To prompt the user to issue an instruction for executing the training, a display method other than the above-described ones is also applicable. For example, displaying a pop-up window for promoting the user to execute the training is a possible method. An example of the pop-up window is illustrated in FIG. 8B. At this time, only the pop-up window is activated, and other windows are deactivated. By changing the active window in this way, the user is able to easily notice that the training has become executable even while the user is performing the defect data input operation. Basically, a timing to display the pop-up window may be immediately after the determination processing in S506. At such a timing, it is easier for the user to most promptly execute the necessary training. However, another timing is also applicable. For example, the pop-up window may be displayed at a timing of suspending or ending the application to prompt the user to execute the training.

The first exemplary embodiment has been described above in which the storage status of the training data is displayed and the user is notified that the training is executable based on the storage status of the training data, and is prompted to execute the training. For example, a form in which the user is entrusted with determination to execute the training in this way can be effectively utilized particularly in a certain application. Such an application is incorporated in a service that offers the training of a classifier and processing for detecting a detection target by using the trained classifier, as charged options. In such cases, the user can determine whether to rely on an automatic detection by the classifier after performing minimum necessary operation while feeling the load related to the user's defect data input operation. However, the information processing apparatus 300 may automatically execute the training without the instruction by the user. More specifically, if the determination unit 316 determines that the storage amount has reached the reference amount (YES in S506), the processing proceeds to S509. In S509, the training unit 317 executes the training. By automatically executing the training, it is possible to avoid the training data from being stored more than necessary and to prevent the user from forgetting to execute the training.

In the exemplary embodiment described above, a case where a pair of the user-input defect data and the corresponding image is stored as the training data has been described. However, in some embodiments, other data is used as the training data. For example, a training data database (DB) may be prepared in advance, and data is taken out from the training data DB to be used as the training data in calculating the storage amount of the training data in the processing in S504.

In the above-described exemplary embodiment, the defect, such as the crack, is checked in the operation for checking the captured image of the inspection target in the inspection for infrastructure. However, the application of the exemplary embodiment is not limited to a specific field. For example, the exemplary embodiment is applicable to an outer appearance inspection operation for checking a fault, such as a scar (detection target), from an image of a product (inspection target) in a factory, and a medical diagnostic operation for checking a lesion (detection target) from a captured image of a human body (inspection target) in a hospital. In addition, the image is not limited to an optically captured image and may be, for example, vector data.

In the above-described first exemplary embodiment, the user can check the storage status of the training data on a screen while performing the input operation of the training data for detecting and identifying the defect, such as a crack or scar. A screen output indicating that the training has become executable is performed at the same time as when the training data reaches a predetermined amount, whereby the user can appropriately determine a timing of executing the training.

The first exemplary embodiment has been described above using an example in which the pair of the defect data input to part of the inspection target image and the corresponding image is stored as the training data part way in the defect data input operation, and the storage status is displayed. While the amount of the training data is smaller than the reference amount (necessary amount), the user continues the defect data input operation to compensate for an insufficient amount of the training data. To efficiently perform the input operation, it is necessary to input the defect data so that the training data of an insufficient type (data classification) is preferentially stored. A second exemplary embodiment will be described below using an example in which an image corresponding to the type of the training data insufficient for the reference amount is selected, from the inspection target image group, and displayed to support the defect data input operation to be preferentially performed for such type of the training data. More specifically, based on the storage status of the training data, the data classification with which the amount of the training data is insufficient for the reference amount is identified, and an image having a background texture that coincides with (or is similar to) that of the data classification, from the inspection target image group, is selected. The selected image is displayed in a defect data input screen and, if the user-input defect data contains a defect that falls into the insufficient data classification, the defect data is stored as the training data belonging to the data classification. In the present exemplary embodiment, the inspection target image that is likely to be the training data for the insufficient data classification relative to the reference amount is preferentially displayed for the defect data input operation to prompt the user to input the defect data. The second exemplary embodiment will be described below centering on a difference from the first exemplary embodiment.

Figure 9A:
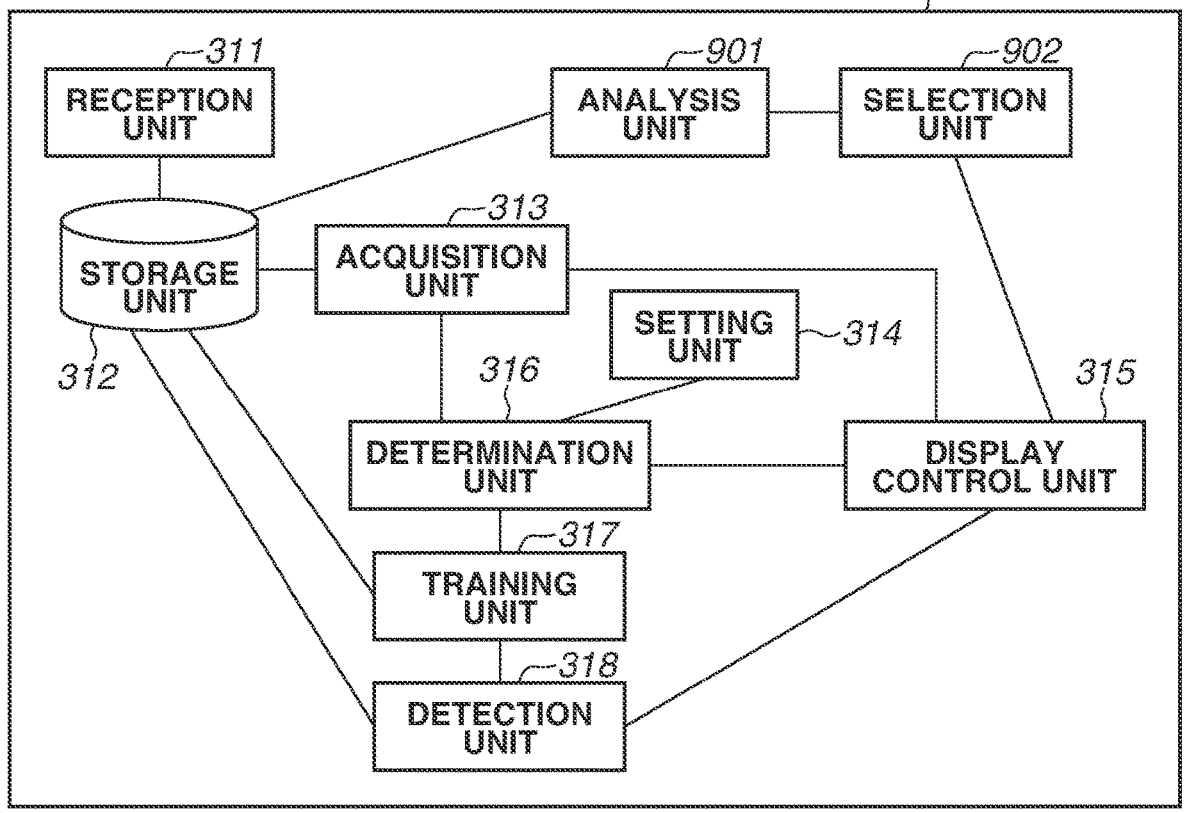
FIGS. 9A and 9B are block diagrams illustrating other examples of configurations of the information processing apparatus.

A hardware configuration of an information processing apparatus 300 according to the second exemplary embodiment is similar to that according to the first exemplary embodiment illustrated in FIG. 3A. Thus, a redundant description thereof will be omitted. FIG. 9A is a diagram illustrating an example of a software configuration of the information processing apparatus 300 according to the second exemplary embodiment. The software configuration according to the present exemplary embodiment differs from that according to the first exemplary embodiment illustrated in FIG. 3B in that an analysis unit 901 and a selection unit 902 are additionally provided. The analysis unit 901 is a function unit of the CPU 301 and analyzes the inspection target images, on which the defect data input operation is yet to be performed, stored in the storage unit 312 to acquire the properties of each of the inspection target images. The selection unit 902 is a function unit of the CPU 301 and selects, from the inspection target image group stored in the storage unit 312, the image identified to prompt the user to input the defect data.

Figure 10:
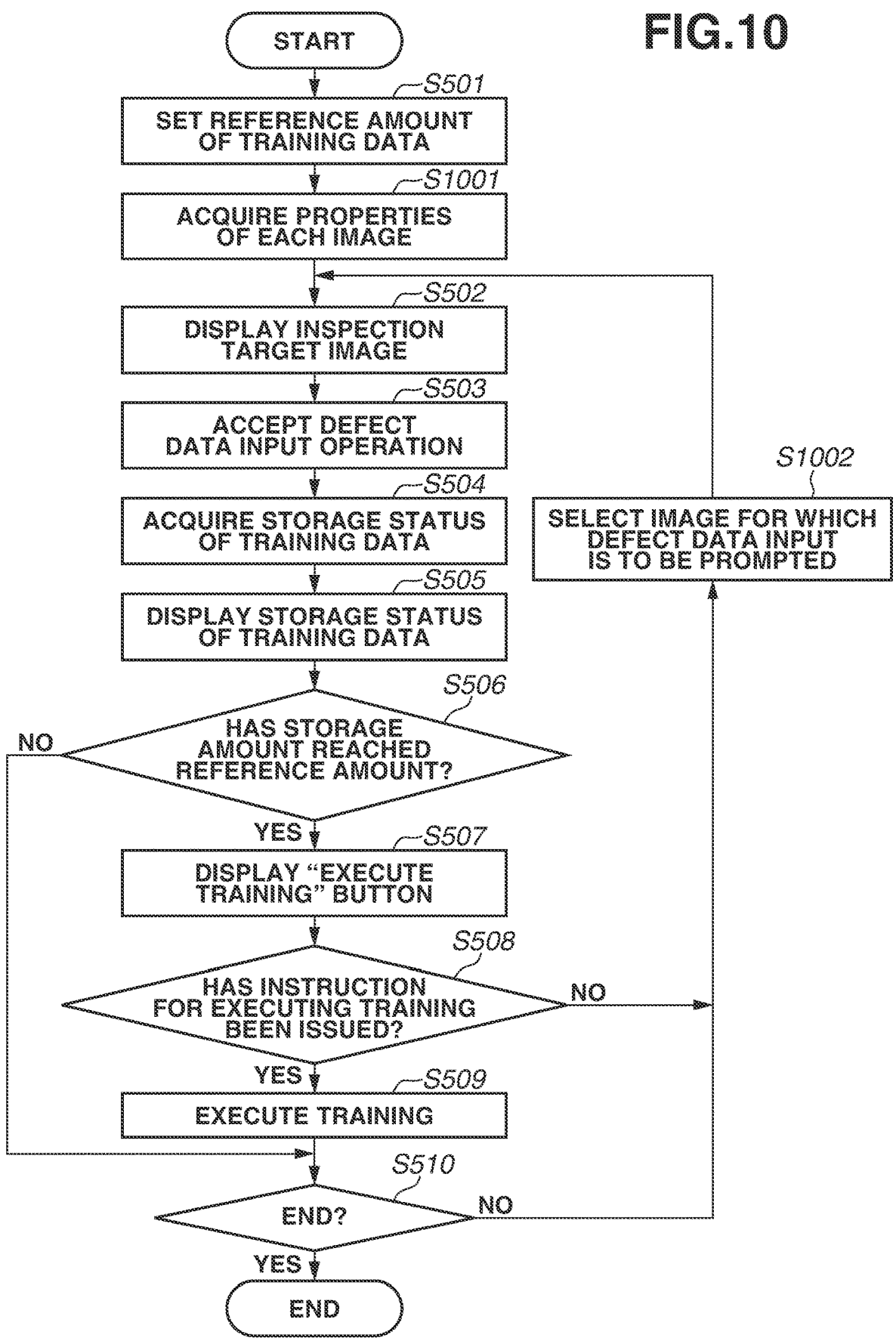
FIG. 10 is a flowchart illustrating another example of processing performed by the information processing apparatus.

FIG. 10 is a flowchart illustrating an example of main processing performed by the information processing apparatus 300 according to the second exemplary embodiment. In the flowchart illustrated in FIG. 10, in an operation indicated with the same operation number as that in the flowchart illustrated in FIG. 5 according to the first exemplary embodiment, processing equivalent to the processing according to the first exemplary embodiment is executed. In the second exemplary embodiment, after the reference amount of the training data is set in S501, the processing proceeds to S1001. In S1001, the analysis unit 901 reads the inspection target images stored in the storage unit 312, analyzes the inspection target images, and acquires information about the properties of each of the images. Similar to the first exemplary embodiment, the acquired properties of each of the images according to the present exemplary embodiment include the color and texture of the concrete wall surface. The method for acquiring the properties is similar to the method described in the first exemplary embodiment (S504), and detailed descriptions thereof will be omitted. In the second exemplary embodiment, if the determination unit 316 determines that the instruction for executing the training is not issued (NO in S508) and determines that the instruction for ending the application is not issued (NO in S510), the processing proceeds to S1002. In S1002, the selection unit 902 selects, from the remaining images in the inspection target image group, an image for which an input of the defect data is to be prompted based on the properties of the inspection target image acquired in S1001 and the storage status of the training data acquired in S504. Then, the processing returns to S502. In S502, the display control unit 315 controls the display unit 305 to display the selected image.

The processing in S1002 for selecting the image for which the input of the defect data is to be prompted will be described in detail below with reference to FIGS. 11A, 11B, 11C, and 11D. FIG. 11A schematically illustrates an example of an inspection target image group 1101 according to the present exemplary embodiment and the corresponding defect data 1102. The defect data 1102 corresponds to an image group 1103, which is part of the inspection target image group 1101. FIG. 11B illustrates an example of the storage status of the training data and corresponds to the example illustrated in FIG. 7B according to the first exemplary embodiment. In FIG. 11B, the training data for part of a data classification 1111 is insufficient. To compensate for the insufficiency, an inspection target image corresponding to the data classification 1111 is selected from an image group 1104 illustrated in FIG. 11A to support the user's defect data input operation to be preferentially performed on the selected image.

To select, from the image group 1104 to which the defect data has not yet been input, the image for which an input of the defect data is to be prompted, in the present exemplary embodiment, information about the properties of the inspection target image acquired in S1001 illustrated in FIG. 10 is used. More specifically, an image having the same properties as the data classification 1111 (gray color and smooth texture of the concrete wall surface) from the image group 1104 is selected. Images 1105, 1106, and 1107 illustrated in FIG. 11C represent images having the same image properties as the data classification 1111 and selected from the image group 1104. In S1002, the CPU 301 further selects one of the images 1105, 1106, and 1107 and displays the image on the display unit 305 so that the input of the defect data is to be preferentially performed. FIG. 11D illustrates an example of a state where the image 1105 illustrated in FIG. 11C and a progress display area 1122 as a display item indicating the storage status of the training data are displayed together in a window 1121. The user performs the defect data input operation while checking the image 1105. As a result, if an obtained defect pattern of the defect data is the crack, which is the same as that of the data classification 1111, a pair of the defect data and the image 1105 is stored as the training data belonging to the data classification 1111. In the second exemplary embodiment, the information obtained in S1001 is only background information of the inspection target image. Thus, if the type of the input defect data is not the crack as a result, the training data belonging to the data classification 1111 does not increase.

After the defect data input operation is performed on the image 1105, display is changed to the other images 1106 and 1107, and the input of the defect data is preferentially receives until the storage amount of the training data of the data classification 1111 reaches the reference amount. To change the image on the window, any method is applicable. For example, clicking a Next Image button 1123 illustrated in FIG. 11D is a possible method. In the second exemplary embodiment, an Execute Training button is also displayed when the storage amount of the training data of the data classification 1111 reaches the reference amount. In the second exemplary embodiment, the CPU 301 selects an image recommended to be preferentially stored as the training data and presents the image to the user as described above. Thus, the user does not have to search for an image for which the input of the defect data is to be performed from among many images, and can efficiently generate the training data.

In the second exemplary embodiment, a similar effect can be obtained even if a partial modification is added as described below. The method for displaying an image for which the user is prompted to input the defect data for the specific data classification to preferentially generate the training data for the data classification with an insufficient storage amount is not limited to the above-described method in which images are displayed one by one. For example, in one displayed image, a partial area thereof for which an input of the defect data is to be preferentially prompted may be noticeably displayed. In the inspection for infrastructure, the size of one inspection target image is very large (e.g., 10,000*10,000 pixels or more). Thus, it takes time and effort to input the defect data while checking the image from corner to corner. In such a case, the CPU 301 displays a partial area in one image that is highly likely to serve as the training data for the data classification with which the amount of the training data is insufficient for the reference amount as a portion for which an input of the defect data is to be preferentially prompted. This enables the user to efficiently store the training data.

Figure 12A:
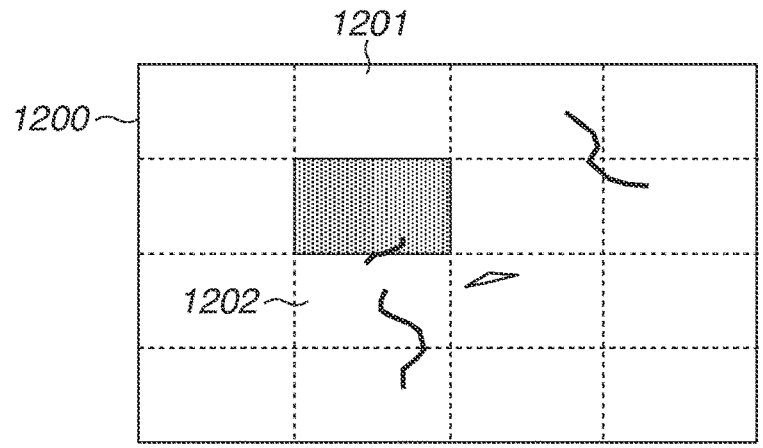
FIGS. 12A, 12B, and 12C are diagrams schematically illustrating processing for noticeably displaying a partial area for which an input of defect data is to be preferentially promoted.

Processing for noticeably displaying a partial area in one image, for which the input of the defect data is to be preferentially promoted, will be described below with reference to FIGS. 12A, 12B, and 12C. The display processing described below is inserted, for example, after S1002 in the flowchart illustrated in FIG. 10. The display control unit 315 acquires the inspection target image from the storage unit 312 and divides the image into a predetermined division size. The division size may be any size that is easy to be viewed, such as 800×600 pixels. FIG. 12A illustrates an inspection target image 1200 and a grid 1201 that divides the image. A partial area 1202 illustrated in FIG. 12A is an example of one divided area. Then, the CPU 301 acquires information about image properties for each divided area, i.e., partial area. The image properties to be acquired include the color and texture of the concrete wall surface. The method for acquiring these image properties is similar to that according to the first exemplary embodiment, and redundant descriptions thereof will be omitted. Based on the image properties acquired for each partial area and the storage status of the training data, the CPU 301 displays, in an application window, a partial area for which the input of the defect data is to be prompted.

Figure 12B:
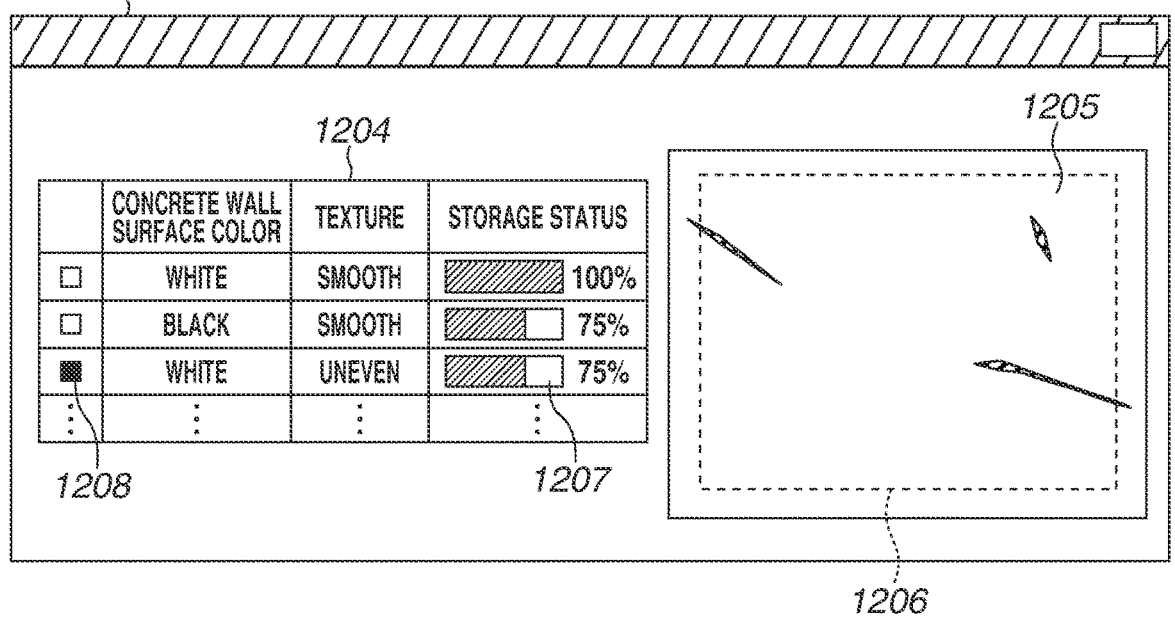
Figure 12C:
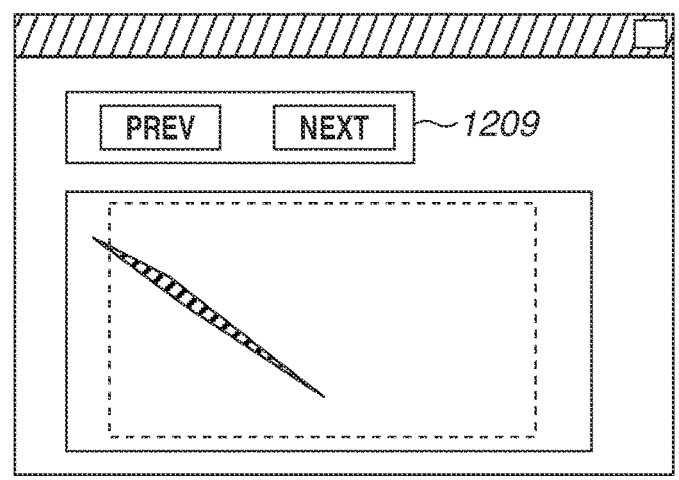

FIG. 12B illustrates a storage status 1204 for each data classification and an area 1205 that is a part of the inspection target image displayed in an application window 1203. A frame 1206 indicated with dotted lines represents the partial area corresponding to a data classification 1207 for which the training data is insufficient. Noticeably displaying the partial area in the image in this way makes it easier for the user to recognize which area to check to store the insufficient training data. A user interface for facilitating a search in peripheral regions, for example, a scroll bar displaying item may also be displayed. In FIG. 12B, the area corresponding to a single data classification is displayed. However, an image display range on the window may be enlarged to display areas corresponding to a plurality of data classifications in frames at the same time. A color, decoration, and thickness of the frame may be changed for each of the data classifications.

The noticeable display may be automatically performed to suit the storage status of data or performed in response to a user instruction. If the noticeable display is to be performed in response to the user instruction, the noticeable display can be performed in response to the user selecting any item of the data classification. More specifically, the user clicks a check box 1208 of each of the data classifications illustrated in FIG. 12B to turn the noticeable display in the area 1205 ON or OFF. As another method for performing the noticeable display, the target partial area or target image can be popped up. FIG. 12C is a diagram illustrating a state where an area corresponding to the data classification with which the training data is insufficient is extracted from the inspection target image and is popped up. When the defect data input operation is completed, the user clicks a display area change button 1209 to change the display. The user does not have to move a display position of the inspection target image in the window and can proceed with the defect data input operation with a little trouble.

The method for selecting, from the inspection target image group, an image for which the input of the defect data is to be preferentially prompted is not limited to narrowing down by the background information (background color and texture) as described above. For example, another possible method may be selecting images or areas in descending order of possibility that a defect exists by using a simple defect detector prepared in advance. The defect detector in this method is a trained detector that outputs a score indicating the possibility that the defect exists in the image with a real number from 0 to 1. The CPU 301 executes identification processing by using the detector to acquire the score indicating the possibility that the defect exists for each image or each region. Based on the acquired score, the CPU 301 displays the images or areas on the display unit 305 in descending order of the scores to prompt the input of the defect data. Selecting an image or area in this way makes it easier to efficiently store the training data containing many defects. With any one of the above-described modifications employed, in the second exemplary embodiment, a screen for prompting the user to issue an instruction for executing the training is displayed when the storage amount has reached the reference amount, similar to the first exemplary embodiment. As described above, in the second exemplary embodiment, the necessary training data can be stored more efficiently.

The first and the second exemplary embodiments have been described above using an example in which the pairs of the defect data, which is input to part of the inspection target image, and the corresponding image are stored as the training data part way in the defect data input operation, and the storage status is displayed. A third exemplary embodiment, on the other hand, will be described below using an example in which a classifier is retrained by using a result of defect data correction operation performed by the user as the training data. The defect data is the data acquired as a result of the defect detection processing using the trained classifier (trained model).

For example, if there is a trained classifier that has trained based on a result of the inspection for infrastructure performed in the past, the classifier-based defect detection processing can be performed once to improve efficiency of the defect data input operation performed on a newly acquired inspection target image group. Accordingly, the third exemplary embodiment has an advantage that, by the user performing an operation for correcting the acquired detection result, the operation efficiency can be largely improved in comparison with a case of inputting the defect data from scratch through a tracing operation. However, in a case where defect detection performance decreases due to various factors, such as a large characteristic difference between a previously inspected structure and a newly inspected structure, an amount of operations for correcting the detection result increases. In this case, the amount of user operations is not reduced. Thus, the classifier is retrained using the detection result that has been corrected so far as retraining data. Accordingly, the defect detection performance is improved. Then, the defect detection processing is performed on the remaining images that are yet to undergo the correction operation. As a result, the defect detection result for the remaining images becomes data that is improved compared to the data before the retraining, making it possible to reduce the load on the user's correction operations.

However, in a case where the defect detection performance is sufficiently high, an effect in terms of reducing the correction operations is unlikely to be obtained by executing the retraining. In other words, retraining a classifier having low performance provides a higher effect of the retraining than retraining a classifier having sufficiently high performance. For this reason, the third exemplary embodiment will be described below using an example in which the detection performance is calculated while the user is performing the correction operations on the defect detection result, and the calculated detection performance is used as a factor for determining a timing of prompting the user to execute the retraining. More specifically, display control is performed to prompt the user to execute the retraining in a case where the detection performance is lower than a predetermined criterion, i.e., in a case where the retraining is highly likely to reduce the load on the user's correction operations.

The present exemplary embodiment will also be described using an example in which, assuming the inspection of wall surface images of a concrete structure, the inspection target is a concrete wall surface and the detection target is a crack. In the present exemplary embodiment, F-measure that is a performance index in consideration of both a false detection result and a non-detection result is used as an example of an index for comparing the detection performance. The F-measure takes a value from 0 to 1, and the higher the performance is, the closer to 1 the F-measure is. However, the index to be used in the present exemplary embodiment is not limited thereto.

Figure 9B:
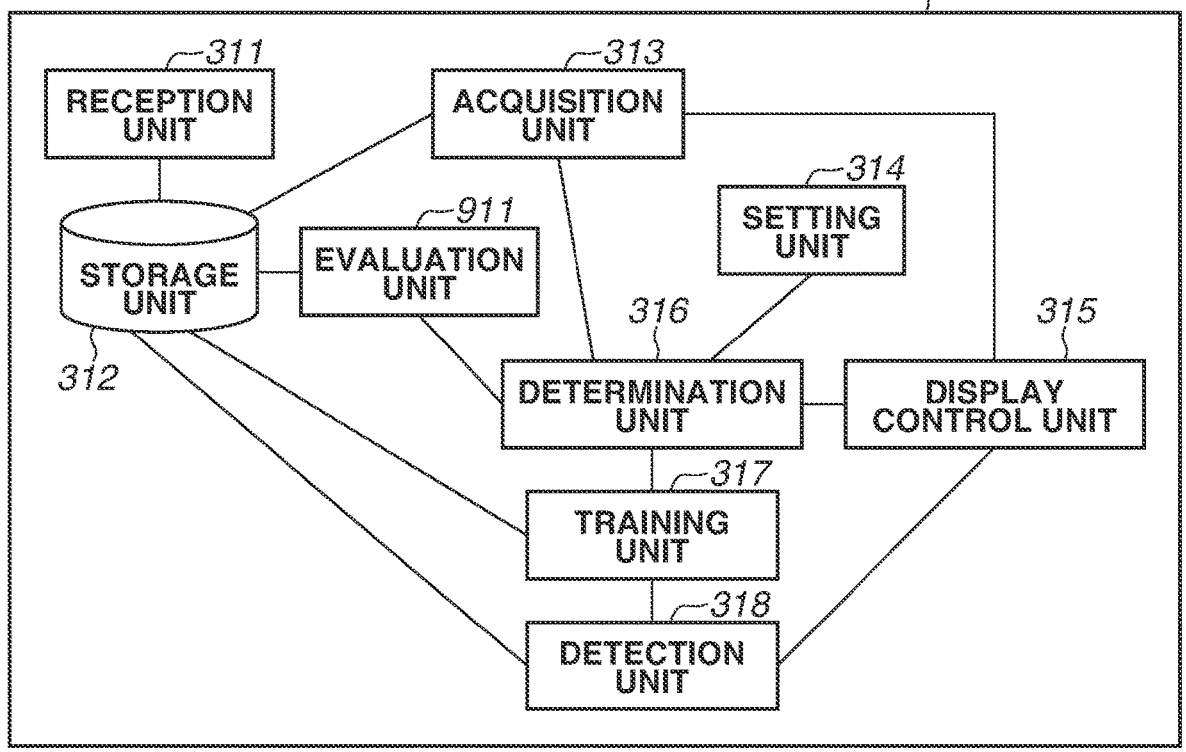

A hardware configuration of the information processing apparatus 300 according to the third exemplary embodiment is similar to that according to the first exemplary embodiment illustrated in FIG. 3A, and redundant descriptions thereof will be omitted. FIG. 9B is a diagram illustrating an example of a software configuration of the information processing apparatus 300 according to the third exemplary embodiment. The software configuration according to the present exemplary embodiment differs from that according to the first exemplary embodiment illustrated in FIG. 3B in that an evaluation unit 911 is additionally provided. In the third exemplary embodiment, the reception unit 311 receives an operation for correcting defect data information (position and type). The evaluation unit 911 is a function unit of the CPU 301 and evaluates performance of the detection processing performed by the detection unit 318 based on the result of the correction operation. In the present exemplary embodiment, the evaluation unit 911 evaluates the performance by calculating the F-measure. In the present exemplary embodiment, the determination unit 316 performs the determination processing based on the storage amount of the training data and the calculated F-measure. Based on the determination result, the display control unit 315 controls display to prompt the user to issue an instruction for executing the retraining.

Figure 13A:
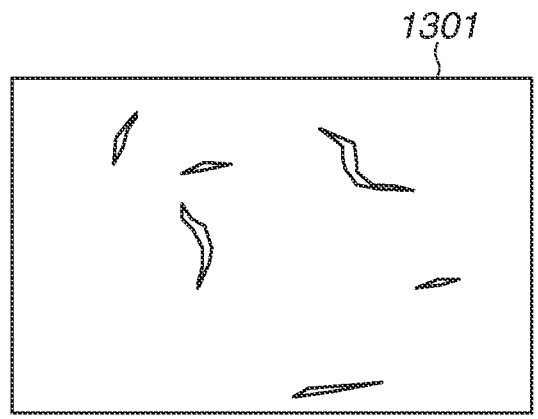
FIGS. 13A, 13B, and 13C are diagrams illustrating examples of defect detection results before and after performing a correction operation.
Figure 13B:
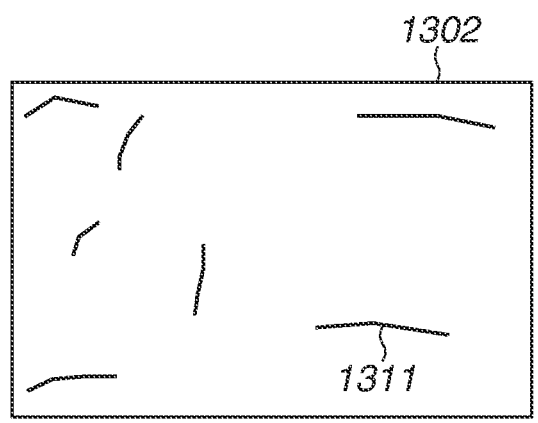
Figure 13C:
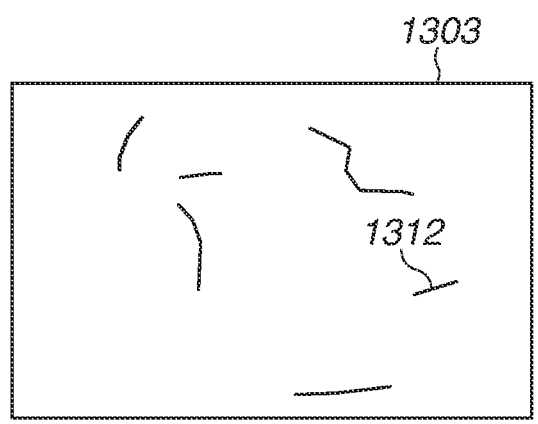

FIGS. 13A to 13C are diagrams illustrating an example of the defect data indicating the defect detection result according to the third exemplary embodiment, i.e., the defect data before and after the user performs the correction operation. An image 1301 is a captured inspection target image of a concrete wall surface including a plurality of cracks. However, elements other than the cracks are omitted to schematically illustrate a state of the cracks. In an actual inspection target image, elements, such as a line of a concrete joint, a stain, and unevenness, appear together with the cracks. A detection result 1302 represents the defect data as a result of applying the defect detection method to the image 1301. A detection result 1303 represents the defect data as a result of the correction operations performed by the user based on the detection result 1302. For defect data 1311 in the detection result 1302, there is no crack in the original image 1301. This means that the defect data 1311 is falsely detected. The false detection occurs, for example, if the classifier incorrectly detects a certain element other than a crack as the crack. The user deletes the defect data 1311 through the correction operation. Thus, the detection result 1303 does not include the defect data 1311. A defect data 1312 in the detection result 1303 is new data input by the user and is not detected in the detection result 1302. In this way, the detection result 1302 includes the false detection result and the non-detection result as a result of incorrect crack detection. Amounts of correct answers and incorrect answers in the detection result can be calculated based on the detection results 1302 and 1303 before and after the correction operations. The F-measure used in the present exemplary embodiment can be obtained from the calculated amounts.

Figure 14:
FIG. 14 is a diagram illustrating an example of display data displayed by the information processing apparatus.

FIG. 14 is a diagram illustrating an example of display data according to the present exemplary embodiment. More specifically, FIG. 14 is an example of display data indicating the storage status of the retraining data while the user is performing the correction operations on the defect detection result. FIG. 14 corresponds to the application window 711 illustrated in FIG. 7B in the first exemplary embodiment. In the third exemplary embodiment, the display data includes a display item of F-measure 1401 indicating the detection performance as a display factor. In the present exemplary embodiment, to determine whether to prompt the retraining, it is determined whether the F-measure is smaller than a predetermined value. For example, the determination method can be represented by the following inequality (2).

$$\gamma_p > f_p \ (p=1,2,\ldots,P) \tag{2}$$

A parameter fp represents the F-measure indicating the detection performance for the p-th data classification. A parameter γ represents a performance criterion for each data classification and is set to an arbitrary constant from 0 to 1. As a possible method for determining the parameter γ, for example, a determination method on an experimental basis may be used.

Figure 15:
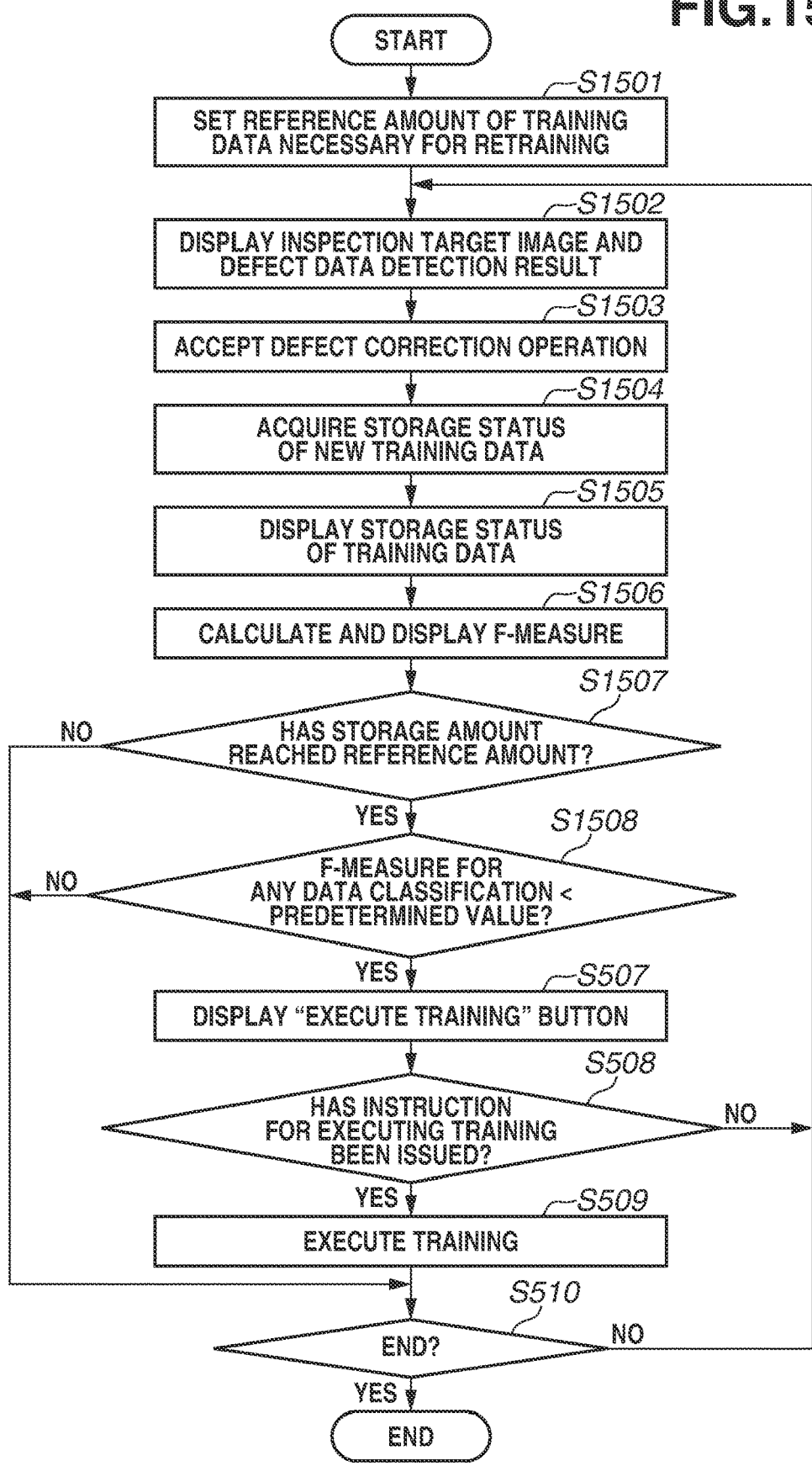
FIG. 15 is a flowchart illustrating a still another example of processing performed by the information processing apparatus.

FIG. 15 is a flowchart illustrating an example of main processing performed by the information processing apparatus 300 according to the present exemplary embodiment. However, an operation executing the same processing as that in the flowchart illustrated in FIG. 5 is indicated with the same operation number, and redundant descriptions thereof will be omitted. In the third exemplary embodiment, when an application for performing the defect detection processing from the inspection target image displays a result of the defect detection by a trained classifier, the work area for the CPU 301 is initialized and the processing in S1501 illustrated in FIG. 15 is started. In S1501, the setting unit 314 sets the reference amount of new training data required for the retraining. In the present exemplary embodiment, the setting unit 314 reads a predetermined value. In S1502, the display control unit 315 controls the display unit 305 to display the inspection target image and the defect data detected from the image in a superimposed manner. In S1503, the reception unit 311 receives the correction operation and stores, in the storage unit 312, the new training data (pair of the inspection target image and the defect data) generated in the correction operation. In S1504, the acquisition unit 313 displays the storage status of the new training data stored in the storage unit 312. In S1505, the display control unit 315 controls the display unit 305 to display the storage status of the training data and the reference amount set in S1501 in a comparable way. Depending on a definition of the set reference amount, the training data processed in S1505 and S1506 may be combined with the training data having been stored before the correction operation.

In S1506, the evaluation unit 911 calculates the F-measure for each data classification. As a method for calculating the F-measure, a known method can be used. However, since an accurate F-measure is not calculated until corrected data is stored to some extent, the processing may proceed to S1507 without calculating the F-measure while the data amount is insufficient. In the present exemplary embodiment, for example, the display control unit 315 displays the calculated F-measure on the display unit 305 by the display control unit 315 generating the display data as illustrated in FIG. 14. In S1507, the determination unit 316 determines whether the storage amount of the acquired training data has reached the set reference amount. In the present exemplary embodiment, unless otherwise specified, the determination unit 316 comprehensively determines whether the storage amount of the training data has reached the predetermined amount for all of the data classifications. If the determination unit 316 determines that the storage amount has reached the reference amount (YES in S1507), the processing proceeds to S1508. If the determination unit 316 determines that the storage amount has not reached the reference amount (NO in S1507), the processing proceeds to S510. In S1508, the determination unit 316 determines whether the F-measure for any of the data classifications has reached the predetermined value based on the inequality (2). If the F-measure for at least one data classification has not reached the predetermined value (YES in S1508), the processing proceeds to S507. If F-measures for all of the data classifications have reached the predetermined value (NO in S1508), the processing proceeds to S510. However, if the F-measure has not been calculated in S1506, the determination unit 316 may always determine that the F-measure has reached the predetermined value (NO in S1508). The processing in S507 and subsequent operations is similar to that according to the first exemplary embodiment, and redundant descriptions thereof will be omitted.

As described above, in the present exemplary embodiment, if the detection performance for any of the data classifications satisfies the inequality (2) (YES in S1508), then in S507, the screen for prompting the retraining is displayed. The F-measure decreases with an increase in the amount of false detection data and non-detection data corrected by the user. Thus, in the present exemplary embodiment, the user is prompted to execute the retraining at the time when the F-measure becomes lower than the predetermined value as the user's operations progress. As a result, the user is prompted to issue an instruction for executing the training at a suitable timing, resulting in an improved efficiency of the user's operations. However, the method for performing the determination based on the inequality (2) for each classification is merely an example, and another determination criteria or determination method can also be used. For example, a possible determination method may be determining whether the detection performance of the entire training data, not the performance index for each data classification, is smaller than the reference value. Further, as still another determination method, the screen for prompting the retraining may be displayed if the F-measure of any one of the data classifications having the top five storage amounts or storage ratios of the training data is smaller than a fixed value. The inequality (2) is used to determine whether the F-measure is smaller than the predetermined value. However, whether to consider a case where the comparison targets are equal as falling short of the predetermined performance or satisfying the predetermined performance can be arbitrarily determined when selecting a determination method and parameters.

The display method illustrated in FIGS. 8A and 8B according to the first exemplary embodiment can be used as a method for displaying the screen for promoting the retraining according to the third exemplary embodiment. The above-described method enables determining whether to prompt the retraining based on the defect detection performance while the user is correcting the defect detection result. This enables the user to determine the timing of executing the retraining. If the detection performance is sufficiently high from the very beginning and the F-measure does not become smaller than the predetermined value during the correction operations, the user can perform the correction operation until completion without being interrupted by the retraining. Although the present exemplary embodiment has been described above using the case where the detection result by the trained classifier is corrected, the defect data subjected to correction may include not only the detection result by the classifier but also the defect data input through the trace operation by the user.

The third exemplary embodiment allows a modification in which the determination based on the storage status (S1507) is omitted. More specifically, in a case where the user's correction operations are performed to an extent that the F-measure can be calculated, and further correction operations have been performed, if the F-measure becomes smaller than the predetermined value for any of the data classifications (YES in S1508), then in S507, the Execute Training button is displayed. In this case, after checking the storage status of the training data displayed in S1504 and S1505, the user can make a decision to execute the retraining when a sufficient storage amount is acquired or at an arbitrary timing.

Figure 16A:
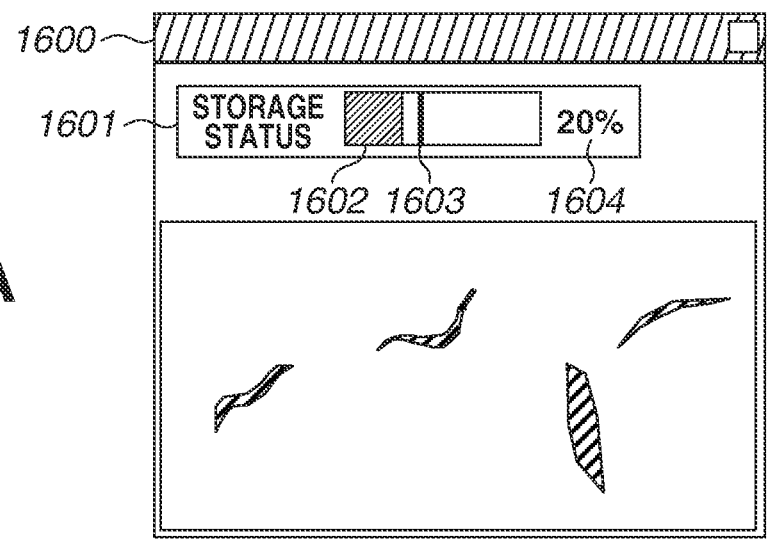
FIGS. 16A, 16B, and 16C are diagrams illustrating other examples of display data displayed by the information processing apparatus.
Figure 16B:
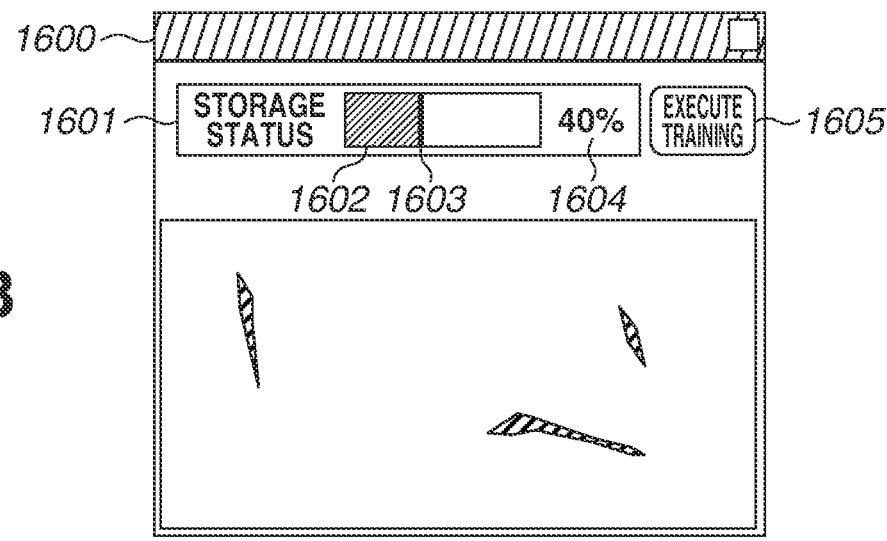
Figure 16C:
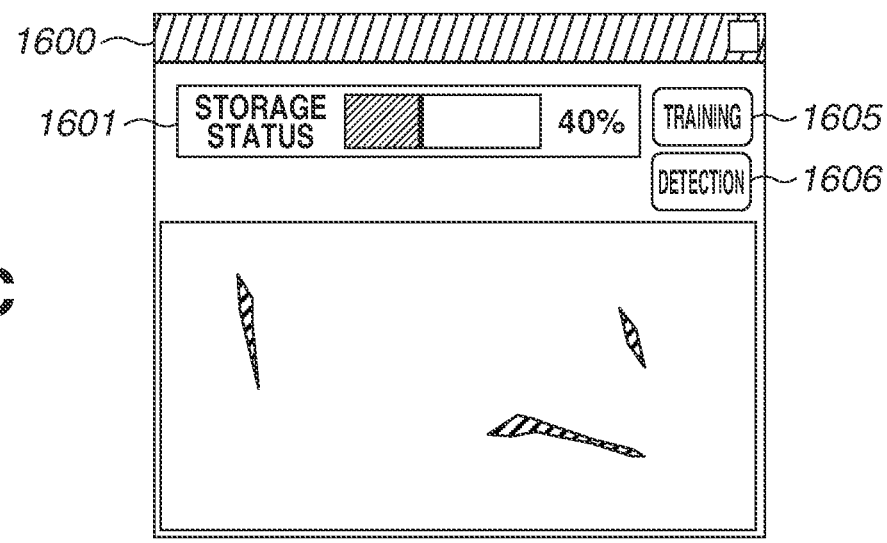

A modification applicable to the first to the third exemplary embodiments will be described below. FIGS. 16A, 16B, and 16C are diagrams illustrating an example of display data displayed according to the modification. In the first to the third exemplary embodiments, the reference amount of the training data is set, for example, as an absolute quantity, such as the number of images. The display data includes the progress bar indicating the progress in the storage status of the training data relative to the reference amount, which is represented as 100%. However, the reference amount may be set as a relative quantity. For example, 40% of the large number of input inspection target images are set as the reference amount. An application window 1600 illustrated in FIG. 16A displays a progress display area 1601 similar to the window 800 illustrated in FIGS. 8A and 8B. A progress bar 1602 and a progress rate 1604 indicate that the progress in the storage status of the training data is 20%. In the modification, the reference amount (40% in this example) is indicated by an index 1603. FIG. 16B illustrates a display state when the training data has reached the reference amount as a result of the continued defect data input operations by the user. In FIG. 16B, the progress bar 1602 has reached the index 1603, and the progress rate 1604 indicates 40%. In addition, a Training button 1605 is displayed to enable the user to confirm that the training data has been stored up to the reference amount. The reference amount of 40% is merely an example. Even when the reference amount is defined as a relative quantity, the reference amount may be set to suit a size of the inspection target, a total amount of the inspection target images, and contents of the classifier.

As illustrated in FIGS. 16A and 16B, the method for displaying the reference amount as an index in the middle, not at the end, of the progress bar can be used even in a case where the reference amount is set as an absolute quantity. This display method makes it easier for the user to recognize not only that the training data is available for the training but also that the manual defect data input operation can be continued. This method is advantageous in a case where generating the training data exceeding the reference amount enables further improvement of the performance of the classifier and in a case where additional training is a charged option. In such cases, the user can easily determine whether to continue the operation depending on the load on the user's operations.

As illustrated in FIG. 16C, a Detection button 1606 for issuing an instruction for executing the detection processing using the trained classifier after the training may be displayed together with the Training button 1605. In this case, in response to a user operation on the Detection button 1606, the detection unit 318 performs the detection processing, and the display unit 305 changes the display to a screen for displaying the detection result. In each of the above-described exemplary embodiments, a purpose of training the classifier on the training data is to detect the detection target. Thus, the overall operation efficiency may be improved by providing a GUI for issuing the instruction for executing the detection processing at the time when the sufficient amount of the training data has been acquired. To enable issuing the instruction for executing the training and detection at once, a display item, such as a button icon integrating the functions of both the Training button 1605 and the Detection button 1606, may be displayed. Needless to say, a similar effect can be obtained if the Detection button 1606 is displayed together with the progress display area with the set reference amount corresponding to 100% as in the window 800 illustrated in FIGS. 8A and 8B.

OTHER EMBODIMENTS

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-055558, which was filed on Mar. 22, 2019 and which is hereby incorporated by reference herein in its entirety.

What is claimed is:
1. An information processing apparatus comprising:
a reception unit configured to receive an input specifying a position of a detection target included in an image;
an acquisition unit configured to acquire a storage amount of training data including a pair of information indicating the image and information indicating the position specified by the input;
a training unit configured to train a training model to detect the detection target from the image based on the stored training data; and
a display control unit configured to control a display unit to display the storage amount, and a reference amount of the training data set as an amount of the training data necessary for the training unit to train the training model, in a comparable way.

2. The information processing apparatus according to claim 1, wherein the display control unit performs control to display, on the display unit, a state where the storage amount changes with reception of the input by the reception unit.

3. The information processing apparatus according to claim 1, wherein the image refers to a captured image of a structure to be inspected as a subject, and the detection target refers to a crack occurring on a surface of the structure.

4. The information processing apparatus according to claim 1, wherein the training unit executes training when the storage amount reaches the reference amount.

5. The information processing apparatus according to claim 1,
wherein, in a case where the storage amount reaches the reference amount, the display control unit controls the display unit to display an item for receiving an instruction for executing training the training model by the training unit, and
wherein the training unit executes the training in response to a user operation on the displayed item.

6. The information processing apparatus according to claim 1, wherein, in a case where the storage amount reaches the reference amount, the training unit executes the training.

7. The information processing apparatus according to claim 1, further comprising a detection unit configured to detect a defect from the image based on the training model,
wherein the image refers to a captured image of a structure to be inspected as a subject, and the detection target refers to the defect occurring on a surface of the structure.

8. The information processing apparatus according to claim 7, wherein the defect includes a crack occurring, on the surface of the structure.

9. The information processing apparatus according to claim 1, further comprising a setting unit configured to set the reference amount based on a user input or a past training result.

10. The information processing apparatus according to claim 1,
wherein the training data is classified based on a characteristic of the image and a type of the detection target,
wherein the acquisition unit acquires the storage amount of the training data for each classification, and
wherein the display control unit performs control to display the storage amount for each classification and the reference amount of the training data in a comparable way.

11. The information processing apparatus according to claim 1, wherein, while the reception unit is receiving the input, the display control unit displays the image and data indicating the position of the detection target to be input on the display unit, and controls the display unit to display a state where the storage amount changes with reception of the input by the reception unit.

12. The information processing apparatus according to claim 1, wherein the reception unit receives an operation for inputting positional information by tracing the detection target on the image displayed on the display unit.

13. The information processing apparatus according to claim 1, further comprising a detection unit configured to detect the detection target from the image based on a trained model having been trained by the training unit,
wherein the reception unit receives an operation for correcting positional information indicating the detection target detected from the image by the detection unit.

14. The information processing apparatus according to claim 13, wherein the training unit executes retraining of the trained model based on a result of the correcting operation received by the reception unit.

15. The information processing apparatus according to claim 14, further comprising an evaluation unit configured to evaluate a detection result by the detection unit,
wherein the training unit executes the retraining in a case where the evaluation unit evaluates that performance of detection processing by the detection unit is lower than a predetermined reference value.

16. The information processing apparatus according to claim 15,
wherein, in the case where the evaluation unit evaluates that the performance of the detection processing by the detection unit is lower than the predetermined reference value, the display control unit controls the display unit to further display an item for receiving an instruction for executing the retraining by the training unit, and
wherein the training unit executes the retraining in response to a user operation on the displayed item.

17. The information processing apparatus according to claim 7,
wherein, in a case where the storage amount reaches the reference amount, the display control unit controls the display unit to further display an item for receiving an instruction for executing processing for detecting the defect from the image based on the training model having trained the stored training data, and
wherein the detection unit executes the detecting processing in response to a user operation on the displayed item.

18. A method for controlling an information processing apparatus, the method comprising:
receiving, by a reception unit, an input specifying a position of a detection target included in an image;
acquiring, by an acquisition unit, a storage amount of training data including a pair of information indicating the image and information indicating the position specified by the input;
training, by a training unit, a training model to detect the detection target from the image based on the stored training data; and
controlling, by a display control unit, a predetermined display unit to display the storage amount, and the reference amount of the training data set as an amount of the training data necessary for the training unit to train the training model, in a comparable way.

19. A non-transitory computer-readable recording medium storing a program that causes a computer to function as:
a reception unit configured to receive an input specifying a position of a detection target included in an image;
an acquisition unit configured to acquire a storage amount of training data including a pair of information indicating the image and information indicating the position specified by the input;
a training unit configured to train a training model to detect the detection target from the image based on the stored training data; and
a display control unit configured to control a display unit to display the storage amount, and a reference amount of the training data set as an amount of the training data necessary for the training unit to train the training model, in a comparable way.

20. An information processing system comprising:
a reception unit configured to receive an input specifying a position of a detection target included in an image;
an acquisition unit configured to acquire a storage amount of training data including a pair of information about the image and information about the input position;
a training unit configured to train a training model to detect the detection target from the image based on the stored training data;
a display control unit configured to control a display unit to display the storage amount, and a reference amount of the training data set as an amount of the training data necessary for the training unit to train the training model, in a comparable way; and a detection unit configured to detect the detection target from the image based on a trained model having been trained by the training unit after the storage amount has reached the reference amount.

* * * * *